US012273874B2

(12) United States Patent
Yang et al.

(10) Patent No.: US 12,273,874 B2
(45) Date of Patent: Apr. 8, 2025

(54) DEMODULATION REFERENCE SIGNAL (DMRS) AND SOUNDING REFERENCE SIGNAL (SRS) BUNDLING UNDER UPLINK TIMING ADVANCE (TA)

(71) Applicant: QUALCOMM Incorporated, San Diego, CA (US)

(72) Inventors: Wei Yang, San Diego, CA (US); Gokul Sridharan, Sunnyvale, CA (US); Hung Dinh Ly, San Diego, CA (US); Hwan Joon Kwon, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/301,972

(22) Filed: Apr. 20, 2021

(65) Prior Publication Data

US 2021/0337570 A1    Oct. 28, 2021

Related U.S. Application Data

(60) Provisional application No. 63/015,434, filed on Apr. 24, 2020.

(51) Int. Cl.
*H04W 72/1268* (2023.01)
*H04L 5/00* (2006.01)
(Continued)

(52) U.S. Cl.
CPC ....... *H04W 72/1268* (2013.01); *H04L 5/0048* (2013.01); *H04W 72/21* (2023.01); *H04L 25/0202* (2013.01)

(58) Field of Classification Search
CPC ......... H04W 72/1268; H04W 72/1284; H04W 56/0045; H04L 5/0048; H04L 25/0202;
(Continued)

(56) References Cited

U.S. PATENT DOCUMENTS

2014/0198664 A1    7/2014 Chen et al.
2016/0197712 A1    7/2016 Sorrentino et al.
(Continued)

OTHER PUBLICATIONS

International Search Report and Written Opinion—PCT/US2021/028507—ISA/EPO—dated Jul. 6, 2021.

*Primary Examiner* — Justin T Van Roie
(74) *Attorney, Agent, or Firm* — Paul M. McAdams; Haynes and Boone, LLP

(57) ABSTRACT

Wireless communication devices, systems, and methods related to bundling of uplink communication signals under timing advance (TA) conditions are provided. For example, a method of wireless communication performed by a user equipment can include receiving, from a base station, a timing advance (TA), wherein the TA is scheduled to be implemented by the user equipment at a first time, the first time being after a start of a first uplink communication of a group of bundled uplink communications scheduled with phase coherence and before a start of a second uplink communication of the group of bundled uplink communications; determining whether to implement the TA at the first time or a second time, the second time being after transmission of the second uplink communication; and implementing the TA based on the determining.

24 Claims, 10 Drawing Sheets

(51) Int. Cl.
*H04W 72/21* (2023.01)
*H04L 25/02* (2006.01)

(58) Field of Classification Search
CPC ............ H04L 25/0204; H04L 25/0226; H04L 25/0228; H04L 5/0078; H04L 5/0044; H04L 5/0051; H04L 5/0053
See application file for complete search history.

(56) References Cited

U.S. PATENT DOCUMENTS

| | | |
|---|---|---|
| 2017/0013582 A1 | 1/2017 | Takekawa et al. |
| 2021/0126753 A1* | 4/2021 | Mochizuki ............ H04L 5/0037 |
| 2021/0153193 A1* | 5/2021 | Lin ................... H04W 56/0045 |

* cited by examiner

DEMODULATION REFERENCE SIGNAL (DMRS) AND SOUNDING REFERENCE SIGNAL (SRS) BUNDLING UNDER UPLINK TIMING ADVANCE (TA)

CROSS-REFERENCE TO RELATED APPLICATIONS

The present application claims priority to and the benefit of U.S. Provisional Application No. 63/015,434, filed Apr. 24, 2020, which is hereby incorporated by reference in its entirety as if fully set forth below and for all applicable purposes.

TECHNICAL FIELD

This application relates to wireless communication systems, and more particularly to bundling uplink communications (e.g., demodulation reference signals (DMRSs), sounding reference signals (SRSs), physical uplink control channel (PUCCH) communications, physical uplink shared channel (PUSCH) communications, etc.) under timing advance (TA) conditions, including associated methods, devices, and systems.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long-term evolution (LTE) technology to a next generation new radio (NR) technology, which may be referred to as 5th Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

To facilitate successful communications between a transmitter and a receiver, the transmitter may transmit one or more reference signals (alone or along with a data transmission). The reference signal(s) may include a predetermined sequence and may be transmitted at predetermined time and/or frequency locations. The receiver may estimate a channel response from the reference signal(s). Based on the channel estimation from processing the reference signal(s), either separately or bundled, the receiver can receive and decode communications from the transmitter.

In some instances, multiple reference signals may be bundled in the time domain across multiple time slots. When the reference signals are bundled, the receiver may perform joint channel estimation using the reference signals received across the multiple time slots, as opposed to performing a separate channel estimation for each individual slot based on the reference signal(s) received in the slot. When reference signals are bundled in the time domain, the transmitter can transmit the different reference signals with phase coherence to allow the receiver to perform the joint channel estimation. However, in some instances, the transmitter may be scheduled to implement a timing advance (TA) between the transmissions of the reference signals that are to be transmitted with phase coherence. In this regard, implementing the TA may cause the reference signals transmitted after implementation of the TA to be out of phase with the reference signals transmitted before the implementation of the TA. However, not implementing the TA may cause the transmitter and receiver to be out of synchronization. Accordingly, improved techniques for bundling uplink communication signals, including reference signals, under TA conditions are provided by the present disclosure.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Aspects of the present disclosure provide mechanisms for bundling uplink communications (e.g., demodulation reference signals (DMRSs), sounding reference signals (SRSs), physical uplink control channel (PUCCH) communications, physical uplink shared channel (PUSCH) communications, etc.) under timing advance (TA) conditions. In this regard, aspects of the present disclosure can enhance uplink cell coverage, especially towards the boundaries of the cell, by facilitating bundling of phase coherent uplink communications, while also maintaining synchronization between the user equipment (UE) and base station (BS) via timing advance (TA).

In an aspect of the disclosure, a method of wireless communication performed by a user equipment includes receiving, from a base station, a timing advance (TA), wherein the TA is scheduled to be implemented by the user equipment at a first time, the first time being after a start of a first uplink communication of a group of bundled uplink communications scheduled with phase coherence and before a start of a second uplink communication of the group of bundled uplink communications; determining whether to implement the TA at the first time or a second time, the second time being after transmission of the second uplink communication; and implementing the TA based on the determining.

In an additional aspect of the disclosure, a method of wireless communication performed by a base station includes transmitting, to a user equipment, a timing advance (TA), wherein the TA is scheduled to be implemented by the user equipment at a first time, the first time being after a start of a first uplink communication of a group of bundled uplink communications scheduled with phase coherence and before a start of a second uplink communication of the group of bundled uplink communications; receiving, from the user equipment, the first uplink communication; receiving, from the user equipment, the second uplink communication; and processing the first uplink communication and the second uplink communication based on when the TA was implemented by the user equipment.

In an additional aspect of the disclosure, a user equipment includes a transceiver configured to: receive, from a base station, a timing advance (TA), wherein the TA is scheduled to be implemented by the user equipment at a first time, the first time being after a start of a first uplink communication of a group of bundled uplink communications scheduled with phase coherence and before a start of a second uplink communication of the group of bundled uplink communications; and a processor in communication with the transceiver, the processor configured to: determine whether to implement the TA at the first time or a second time, the second time being after transmission of the second uplink communication; and implement the TA based on the determination.

In an additional aspect of the disclosure, a base station includes a transceiver configured to: transmit, to a user equipment, a timing advance (TA), wherein the TA is scheduled to be implemented by the user equipment at a first time, the first time being after a start of a first uplink communication of a group of bundled uplink communications scheduled with phase coherence and before a start of a second uplink communication of the group of bundled uplink communications; receive, from the user equipment, the first uplink communication; and receive, from the user equipment, the second uplink communication; and a processor in communication with the transceiver, the processor configured to: process the first uplink communication and the second uplink communication based on when the TA was implemented by the user equipment.

In an additional aspect of the disclosure, a user equipment includes means for receiving, from a base station, a timing advance (TA), wherein the TA is scheduled to be implemented by the user equipment at a first time, the first time being after a start of a first uplink communication of a group of bundled uplink communications scheduled with phase coherence and before a start of a second uplink communication of the group of bundled uplink communications; means for determining whether to implement the TA at the first time or a second time, the second time being after transmission of the second uplink communication; and means for implementing the TA based on the determining.

In an additional aspect of the disclosure, a base station includes means for transmitting, to a user equipment, a timing advance (TA), wherein the TA is scheduled to be implemented by the user equipment at a first time, the first time being after a start of a first uplink communication of a group of bundled uplink communications scheduled with phase coherence and before a start of a second uplink communication of the group of bundled uplink communications; means for receiving, from the user equipment, the first uplink communication; means for receiving, from the user equipment, the second uplink communication; and means for processing the first uplink communication and the second uplink communication based on when the TA was implemented by the user equipment.

In an additional aspect of the disclosure, a non-transitory computer-readable medium has program code recorded thereon for wireless communication by a user equipment, the program code including code for causing the user equipment to receive, from a base station, a timing advance (TA), wherein the TA is scheduled to be implemented by the user equipment at a first time, the first time being after a start of a first uplink communication of a group of bundled uplink communications scheduled with phase coherence and before a start of a second uplink communication of the group of bundled uplink communications; code for causing the user equipment to determine whether to implement the TA at the first time or a second time, the second time being after transmission of the second uplink communication; and code for causing the user equipment to implement the TA based on the determining.

In an additional aspect of the disclosure, a non-transitory computer-readable medium has program code recorded thereon for wireless communication by a base station, the program code including code for causing the base station to transmit, to a user equipment, a timing advance (TA), wherein the TA is scheduled to be implemented by the user equipment at a first time, the first time being after a start of a first uplink communication of a group of bundled uplink communications scheduled with phase coherence and before a start of a second uplink communication of the group of bundled uplink communications; code for causing the base station to receive, from the user equipment, the first uplink communication; code for causing the base station to receive, from the user equipment, the second uplink communication; and code for causing the base station to process the first uplink communication and the second uplink communication based on when the TA was implemented by the user equipment.

Other aspects, features, and advantages of the present invention will become apparent to those of ordinary skill in the art, upon reviewing the following description of specific, exemplary embodiments of the present invention in conjunction with the accompanying figures. While features of the present invention may be discussed relative to certain examples and figures below, all embodiments of the present invention can include one or more of the advantageous features discussed herein. In other words, while one or more embodiments may be discussed as having certain advantageous features, one or more of such features may also be used in accordance with the various other embodiments of the invention discussed herein. In similar fashion, while exemplary embodiments may be discussed below as device, system, or method embodiments, it should be understood that such exemplary embodiments can be implemented in various devices, systems, and methods.

DETAILED DESCRIPTION

Figure 1:
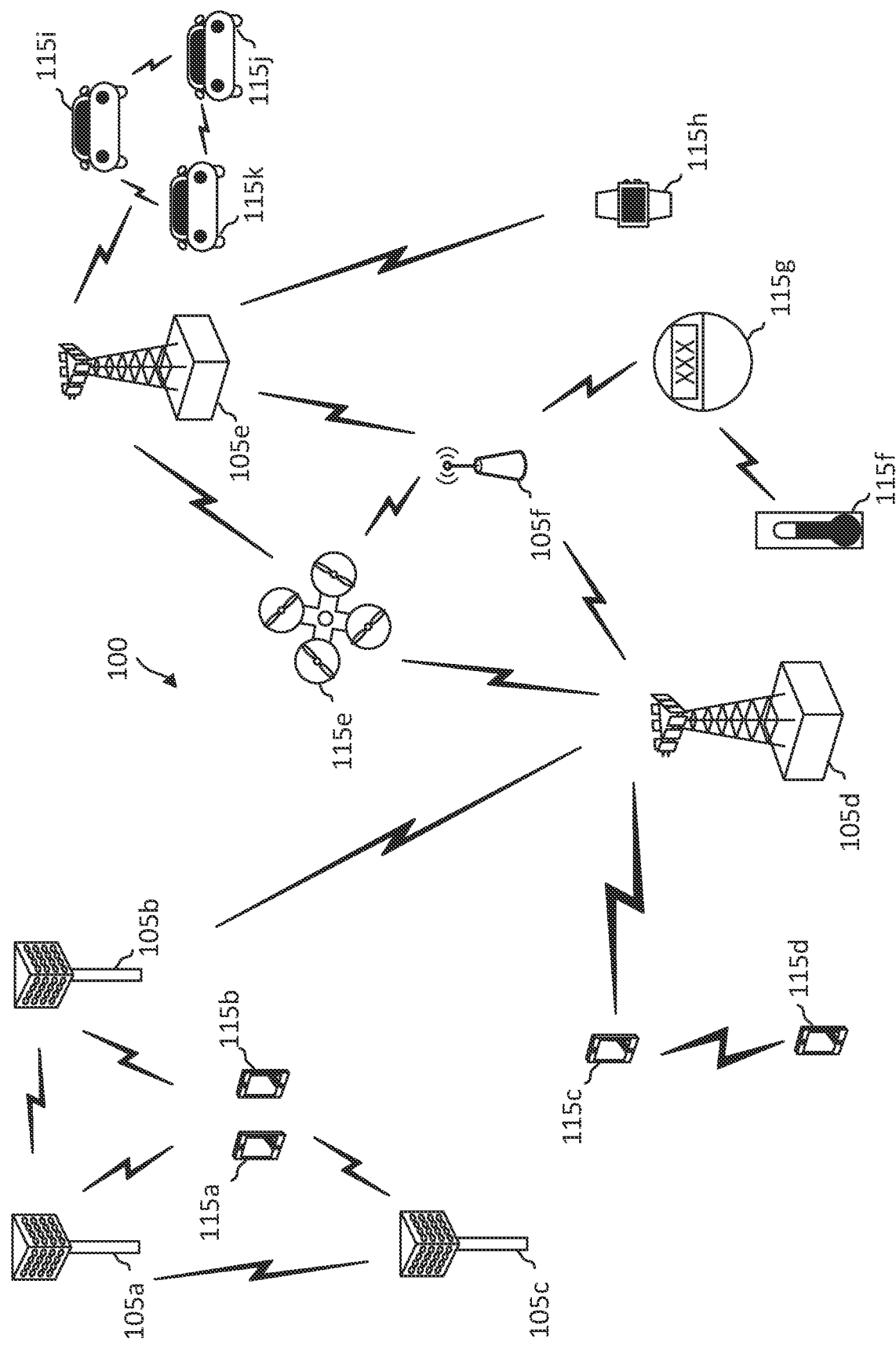
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, 5th Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ULtra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

Aspects of the present disclosure provide mechanisms for bundling uplink communications (e.g., demodulation reference signals (DMRSs), sounding reference signals (SRSs), physical uplink control channel (PUCCH) communications, physical uplink shared channel (PUSCH) communications, etc.) under timing advance (TA) conditions. In this regard, aspects of the present disclosure can enhance uplink cell coverage, especially towards the boundaries of the cell, by facilitating bundling of phase coherent uplink communications, while also maintaining synchronization between the user equipment (UE) and base station (BS) via timing advance (TA).

In this regard, to facilitate successful communications between a transmitter and a receiver, the transmitter may transmit one or more reference signals (alone or along with a data transmission). The reference signal(s) may include a predetermined sequence and may be transmitted at predetermined time and/or frequency locations. The receiver may estimate a channel response from the reference signal(s). Based on the channel estimation from processing the reference signal(s), either separately or bundled, the receiver can receive and decode communications from the transmitter.

In some instances, multiple reference signals may be bundled in the time domain across multiple time slots. When the reference signals are bundled, the receiver may perform joint channel estimation using the reference signals received across the multiple time slots, as opposed to performing a separate channel estimation for each individual slot based on the reference signal(s) received in the slot. When reference signals are bundled in the time domain, the transmitter can transmit the different reference signals with phase coherence to allow the receiver to perform the joint channel estimation. However, in some instances, the transmitter may be scheduled to implement a timing advance (TA) between the transmissions of the reference signals that are to be transmitted with phase coherence. In this regard, implementing the TA may cause the reference signals transmitted after implementation of the TA to be out of phase with the reference signals transmitted before the implementation of the TA. However, not implementing the TA may cause the transmitter and receiver to be out of synchronization. The present disclosure provides improved techniques for bundling uplink communication signals, including reference signals, under TA conditions.

In some instances, the TA is implemented when scheduled, while in other instances the TA implementation is delayed. When to implement the TA can be determined based on a configuration. The configuration may be a dynamic configuration and/or a predetermined/pre-programmed configuration stored in the memory of the UE and/or BS. The configuration may provide one or more rules for determining when to implement the TA. In this regard, the rules may be based on whether bundled uplink communications are scheduled with phase coherence, the number of bundled uplink communications, the length of time necessary for the bundled uplink communications, a magnitude of the TA, one or more other factors, and/or combinations thereof. In this regard, the configuration may provide rules for selecting the timing for a delayed TA implementation. In this regard, the delayed timing can be based on one or more of an uplink-to-downlink switch, a downlink-to-uplink switch, a time gap between the uplink communications, a power change between the uplink communications, and/or uplink communications not being scheduled with phase coherence. Additional features and benefits of the present disclosure are set forth in the following description.

FIG. 1 illustrates a wireless communication network 100 according to some embodiments of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115k are examples of various machines configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink and/or uplink, or desired transmission between BSs, and backhaul transmissions between BSs.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-hop configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as in a vehicle-to-vehicle (V2V)

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In an embodiment, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In an embodiment, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In an embodiment, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as a message 1 (MSG 1), a message 2 (MSG 2), a message 3 (MSG 3), and a message 4 (MSG 4), respectively. In some examples, the random access procedure may be a two-step random access procedure, where the UE 115 may transmit a random access preamble and a connection request in a single transmission and the BS 105 may respond by transmitting a random access response and a connection response in a single transmission. The combined random access preamble and connection request in the two-step random access procedure may be referred to as a message A (MSG A). The combined random access response and connection response in the two-step random access procedure may be referred to as a message B (MSG B).

After establishing a connection, the UE 115 may initiate an initial network attachment procedure with the network 100. When the UE 115 has no active data communication with the BS 105 after the network attachment, the UE 115 may return to an idle state (e.g., RRC idle mode). Alternatively, the UE 115 and the BS 105 can enter an operational state or active state, where operational data may be exchanged (e.g., RRC connected mode). For example, the BS 105 may schedule the UE 115 for UL and/or DL communications. The BS 105 may transmit UL and/or DL scheduling grants to the UE 115 via a PDCCH. The BS 105 may transmit a DL communication signal to the UE 115 via a PDSCH according to a DL scheduling grant. The UE 115 may transmit a UL communication signal to the BS 105 via a PUSCH and/or PUCCH according to a UL scheduling grant. In some embodiments, the BS 105 and the UE 115 may employ hybrid automatic request (HARQ) techniques for communications to improve reliability. Additionally, the UE 115 and/or the BS 105 can utilize DRX (e.g., during RRC idle mode), including connected mode DRX (C-DRX) (e.g., during RRC connected mode), and/or DTX operating modes.

In an embodiment, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some instances, a BS 105 may assign a pair of BWPs within the CC to a UE 115 for UL and DL communications. For example, the BWP pair may include one BWP for UL communications and one BWP for DL communications. In some instances, the BS 105 may dynamically switch the UE 115 from one BWP to another BWP, for example, from a wideband BWP to a narrowband BWP for power savings or from a narrowband BWP to a wideband BWP for communication.

The BS 105 may additionally configure the UE 115 with one or more CORESETs in a BWP. A CORESET may include a set of frequency resources spanning a number of symbols in time. The BS 105 may configure the UE 115 with one or more search spaces for PDCCH monitoring based on the CORESETS. The UE 115 may perform blind decoding in the search spaces to search for DL control information from the BS. The BS 105 may configure the UE 115 with various different CORSETs and/or search spaces for different types of PDCCH monitoring (e.g., DL/UL schedules and/or wake-up information). In an example, the BS 105 may configure the UE 115 with the BWPs, the CORESETS, and/or the PDCCH search spaces via RRC configurations.

In an embodiment, the BS 105 may establish a RRC connection with the UE 115 in a primary cell (PCell) (e.g., over a primary frequency carrier) and may subsequently configure the UE 115 to communicate over a secondary cell (SCell) (e.g., over a secondary frequency carrier). In an embodiment, the BS 105 may trigger the UE 115 to report channel information based on channel-state-information-reference signal (CSI-RS) transmitted by the BS 105. In some instances, the triggering may be aperiodic, which may be referred to as aperiodic-CSI-RS (A-CSI-RS) triggering.

The network 100 may operate over a shared frequency band or an unlicensed frequency band, for example, at about 3.5 gigahertz (GHz), sub-6 GHz or higher frequencies in the mmWave band. The network 100 may partition a frequency band into multiple channels, for example, each occupying about 20 megahertz (MHz). The BSs 105 and the UEs 115 may be operated by multiple network operating entities sharing resources in the shared communication medium and may acquire channel occupancy time (COT) in the share medium for communications. A COT may be non-continuous in time and may refer to an amount of time a wireless node can send frames when it has won contention for the wireless medium. Each COT may include a plurality of transmission slots. A COT may also be referred to as a transmission opportunity (TXOP).

In some aspects, to facilitate successful communications between a transmitter and a receiver, such as a BS 105 and a UE 115 or vice versa, the transmitter may transmit one or more reference signals (alone or along with a data transmission), such as demodulation reference signals (DMRSs), sounding reference signals (SRSs), and/or the like. The reference signal(s) may include a predetermined sequence and may be transmitted at predetermined time and/or frequency locations. The receiver may then estimate a channel response from the reference signal(s). Based on the channel estimation from processing the reference signal(s), the receiver can receive and decode communications from the transmitter.

Further, in some aspects, multiple reference signals may be bundled in the time domain across multiple time slots. When the reference signals are bundled, the receiver (e.g., a BS 105 or a UE 115) may perform joint channel estimation using the reference signals received across the multiple time slots, as opposed to performing a separate channel estimation for each individual slot based on the reference signal(s) received in the slot. When reference signals are bundled in the time domain, the transmitter (e.g., a BS 105 or a UE 115) can transmit the different reference signals with phase coherence to allow the receiver to perform the joint channel estimation. However, as described below with reference to FIG. 2, in some instances, the transmitter may be scheduled to implement a timing advance (TA) between the transmissions of the reference signals that are to be transmitted with phase coherence. In this regard, implementing the TA may cause the reference signals transmitted after implementation of the TA to be out of phase with the reference signals transmitted before the implementation of the TA. However, not implementing the TA may cause the transmitter and receiver (e.g., the BS 105 and the UE 115) to be out of synchronization.

Accordingly, the present disclosure provides improved techniques for bundling uplink communication signals, including reference signals, under TA conditions (e.g., while maintaining synchronization between a UE 115 and a BS 105). In particular, the present disclosure provides mechanisms for a UE 115 and a BS 105 to determine whether to implement a TA as scheduled or with a delay such that synchronization between the UE 115 and the BS 105 is maintained and bundled uplink communications between the UE 115 and the BS 105 may be properly received and decoded (e.g., processed).

Figure 2:
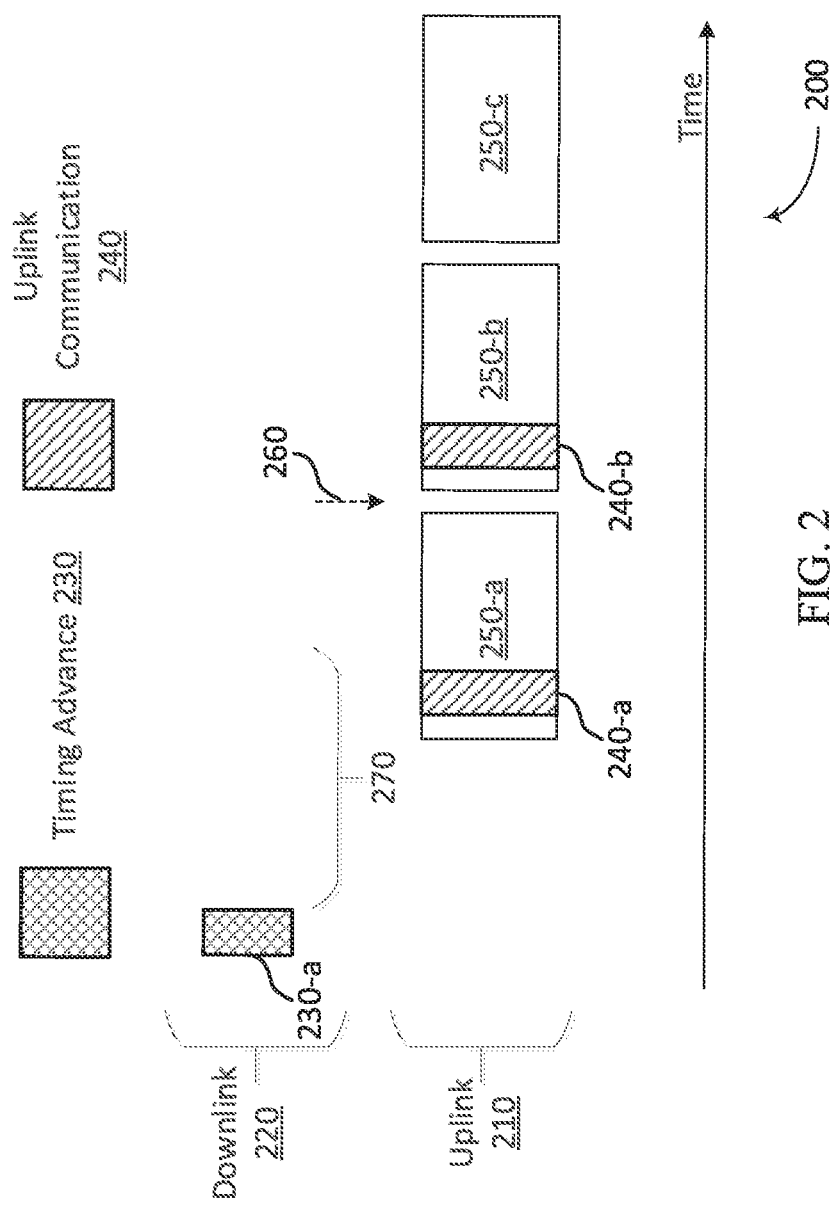
FIG. 2 illustrates uplink bundling and timing advance scheduling according to some aspects of the present disclosure.

FIG. 2 illustrates uplink bundling and timing advance scheduling 200 according to some aspects of the present disclosure. The uplink bundling and timing advance scheduling 200 of FIG. 2 illustrates aspects of one or more uplink channels 210 (e.g., physical uplink shared channel (PUSCH), physical uplink control channel (PUCCH), etc.), one or more downlink channels 220 (e.g., physical downlink shared channel (PDSCH), physical downlink control channel (PDCCH), etc.), a timing advance (TA) 230, and uplink communications 240 (e.g., PUSCH communications, PUCCH communications, demodulation reference signals (DMRSs), sounding reference signals (SRSs), etc.). In FIG. 2, the x-axis represents time in some arbitrary units as shown.

In some instances, DMRS bundling can be an effective technique for enhancing cell coverage, including for uplink communications near the edge or boundary of a cell. At the UE, the DMRSs can be coherently transmitted over different time instants corresponding to different uplink transmissions (e.g., PUSCH transmissions and/or PUCCH transmissions). At the BS, the DMRSs received over different time instants can be coherently filtered and/or combined to enhance the accuracy of channel estimation. That is, the DMRSs received over the different time instants can be processed jointly instead of separately or individually. Similar types of bundling techniques can be applied to other types of uplink communications 240, including without limitation bundling between SRSs, bundling between an SRS and a PUCCH, bundling between an SRS and PUSCH, bundling between PUCCHs, bundling between PUSCHs, bundling between PUSCH and PUCCH, etc.

Timing advance is a technique that can be utilized to achieve uplink and/or downlink synchronization in a cell. In this regard, due to propagation delay, the timing at which the downlink signal is transmitted by the BS and the timing at which the uplink signal is received at the BS may exhibit a large delay, potentially creating an uplink/downlink conflict. Moreover, since the propagation delay from different UEs is typically different, then the timing for uplink signals transmitted from different UEs can be different, which may create undesired inter-symbol interference at the BS. To address this issue, the TA 230 can be utilized. In this regard, the UE can advance (or delay) its uplink transmissions by a certain amount of time (which roughly corresponds to twice the propagation delay between the UE and BS). In some instances, the BS indicates a TA value (e.g., in the unit of multiples of transmission samples (based on the sampling rate, which can depend on the subcarrier spacing)) in the TA 230 transmitted over the downlink channel(s) 220. In some instances, the TA 230 is transmitted in a media access control control element (MAC CE) over the PDSCH. After receiving the TA with the TA value, the UE can implement the TA value by adjusting (e.g., delaying or advancing) its transmission timing.

As shown in FIG. 2, in some instances a TA 230-a is scheduled to be applied by the UE at a time 260. In this regard, in some instances the TA-230a is scheduled to be implemented by the UE starting with an uplink transmission that is at least a time gap 270 (e.g., Tgap) after the UE receives the TA 230-a. In some instances, the length of the time gap 270 is based on a TA processing time of the UE. Accordingly, the time 260 at which the TA is scheduled to implemented by the UE can be based upon when the UE receives the TA from the BS, the time gap 270, a TA processing time of the UE, and/or a communication schedule of the UE. In the illustrated example of FIG. 2, the time gap 270 ends during slot 250-a where uplink communication 240-a is transmitted. Accordingly, in some instances the UE is scheduled to implement the TA 230-a prior to the slot 250-b and the transmission of the associated uplink communication 240-b.

Although the TA 230-a that gets applied by the UE is provided by the BS, in some instances there can still be some slack or difference in the synchronization timing between the UE and the BS. For example, in some instances, this difference can be caused because the UE applies the TA 230-a based on its estimated downlink receive timing, which is not always estimated accurately. As a consequence, upon the implementation of the TA 230-a by the UE, the BS may need to re-estimate the uplink timing and adjust the phase of the received symbols accordingly. In other words, when the UE applies the TA 230-a on an uplink transmission the BS may need to re-estimate the uplink timing. Because the timing and phase of uplink communications are highly correlated, the change in timing resulting from implementing the TA 230-a can result in a corresponding phase change in the uplink communication. Accordingly, in the example of FIG. 2, if the uplink communications 240-a and 240-b are bundled communications scheduled to be transmitted with phase coherence, implementing the TA 230-a at the scheduled time 260 could cause the uplink communications 240-a and 240-b to not have phase coherence and, therefore, prevent the BS from coherently processing the consecutive slots 250-a and 250-b and associated communications 240-a and 240-b. This can be the case even where the UE transmits the uplink communications 240-a and 240-b with phase coherence/continuity. Accordingly, aspects of the present disclosure provide mechanisms for handling uplink bundling and TA scheduling when a TA (e.g., TA 230-a) is scheduled to be implement by a UE between uplink communications that are scheduled to be transmitted with phase coherency (e.g., uplink communications 240-a and 240-b).

Figure 3:
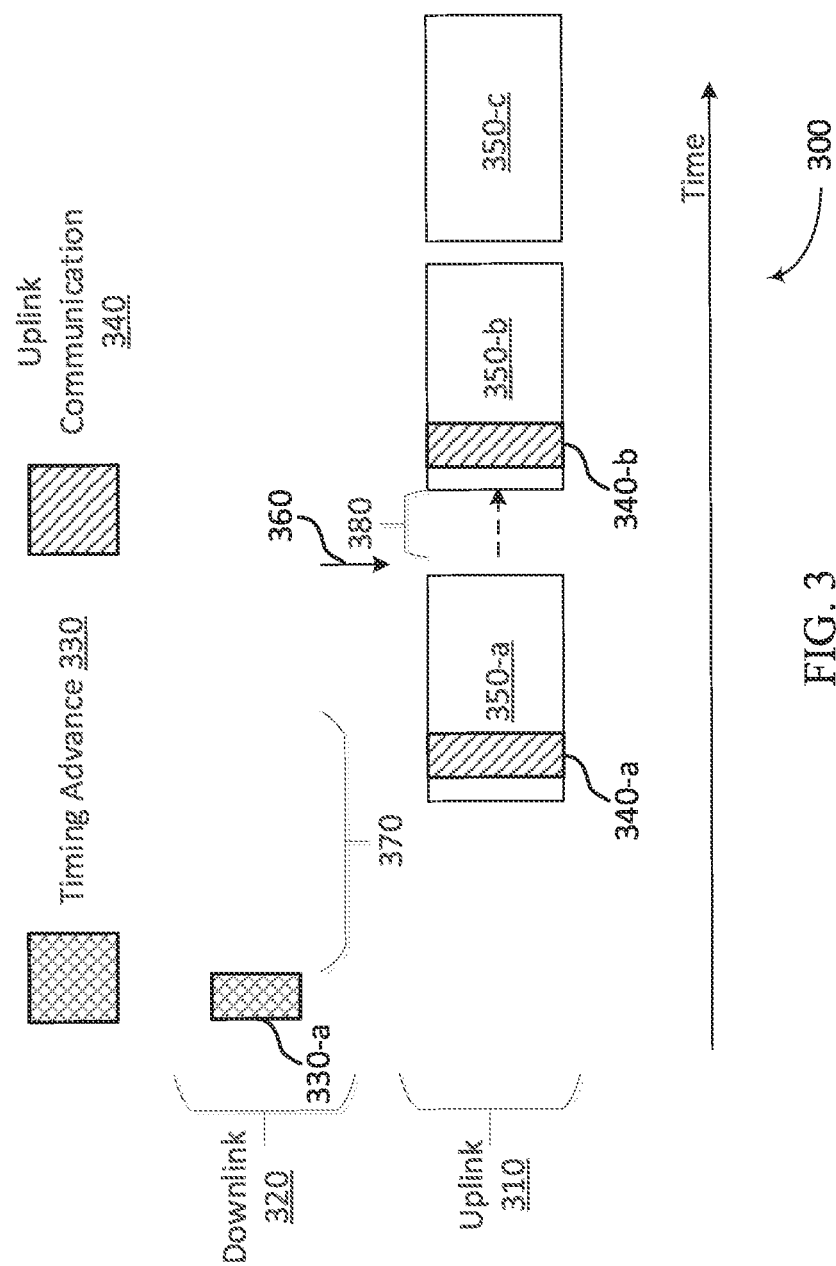
FIG. 3 illustrates uplink bundling and timing advance scheduling according to some aspects of the present disclosure.

FIG. 3 illustrates uplink bundling and timing advance scheduling 300 according to some aspects of the present disclosure. The uplink bundling and timing advance scheduling 300 of FIG. 3 may be similar to and implement aspects of uplink bundling and timing advance scheduling 200 of FIG. 2. The uplink bundling and timing advance scheduling 300 of FIG. 3 illustrates aspects of one or more uplink channels 310 (e.g., physical uplink shared channel (PUSCH), physical uplink control channel (PUCCH), etc.), one or more downlink channels 320 (e.g., physical downlink shared channel (PDSCH), physical downlink control channel (PDCCH), etc.), a timing advance (TA) 330, and uplink communications 340 (e.g., PUSCH communications, PUCCH communications, demodulation reference signals (DMRSs), sounding reference signals (SRSs), etc.). In FIG. 3, the x-axis represents time in some arbitrary units as shown.

As shown, a TA 330-a is transmitted over the downlink channel(s) 320. In some instances, the TA 330-a is transmitted in a MAC CE over the PDSCH. After receiving the TA 330-a, the UE can implement the TA value by adjusting (e.g., delaying or advancing) its transmission timing.

As shown in FIG. 3, in some instances the TA 330-a is scheduled to be applied by the UE at a time 360. In some instances, the TA-330a is scheduled to be implemented by the UE starting with an uplink transmission that is at least a time gap 370 (e.g., Tgap) after the UE receives the TA 330-a. In some instances, the length of the time gap 370 is based on a TA processing time of the UE. Accordingly, the time 360 at which the TA is scheduled to implemented by the UE can be based upon when the UE receives the TA 330-a from the BS, the time gap 370, a TA processing time of the UE, and/or a communication schedule of the UE. In the illustrated example of FIG. 3, the time gap 370 ends during slot 350-a where uplink communication 340-a is transmitted. Accordingly, in some instances the UE is scheduled to implement the TA 330-a prior to the slot 350-b and the transmission of the associated uplink communications 340-b.

In some instances, the UE determines whether to implement the TA 330-a at the time 360 or delay the implementation to a later time (e.g., after transmission of the uplink communication 340-b). In some instances, the UE determines when to implement the TA 330-a based on a configuration. The configuration may be a dynamic configuration received from a BS (e.g., via RRC signaling, MAC CE, DCI, or otherwise) or a predetermined/pre-programmed configuration stored in the memory of the UE. The configuration may provide one or more rules for the UE to utilize in determining when to implement the TA 330-a. In this regard, the rules may be based on whether bundled uplink communications are scheduled with phase coherence, the number of bundled uplink communications, the length of time necessary for the bundled uplink communications, a magnitude of the TA, one or more other factors, and/or combinations thereof. The configuration may also provide rules for the UE to utilize in selecting the timing for implementing the TA 330-a when the implementation is to be delayed from time 360. In this regard, the timing can be based on one or more of an uplink-to-downlink switch, a downlink-to-uplink switch, a time gap between uplink communications, a power change between uplink communications, and/or the uplink communications not being scheduled with phase coherence.

In the illustrated example of FIG. 3, the UE implements the TA 330-a at time 360 as indicated by adjustment 380. Note that adjustment 380 shows an exaggerated delay period simply to illustrate the concept and is not necessarily to scale. It is understood that the adjustment 380 can be an advance or a delay in the uplink timing of the UE and will be based on the value included in the TA 330-a. Implementing the TA 330-a at the scheduled time 360 can cause the uplink communication 340-b to not have phase coherency with uplink communication 340-a. In other words, the UE is not expected to keep the phase coherence between uplink communications 340-a and 340-b if the UE applies the TA 330-a for uplink communication 340-b. Therefore, in some instances the BS processes the uplink communications 340-a and 340-b separately, instead of coherently processing them together.

In some instances, the BS determines when the TA 330-a was implemented by the UE based on the received uplink communications 340-a and 340-b, the TA processing capabilities of the UE, a configuration implemented by the UE, and/or other factors. In some instances, the timing of the implementation of the TA 330-a by the UE is based on a configuration, as discussed above. In some instances, the BS utilizes aspects of the configuration to estimate and/or determine when the UE will implement the TA 330-a. In this regard, as shown in the example of FIG. 3, the BS may determine that the UE will implement the TA at time 360 and, therefore, determine to process the uplink communications 340-a and 340-b separately.

Figure 4:
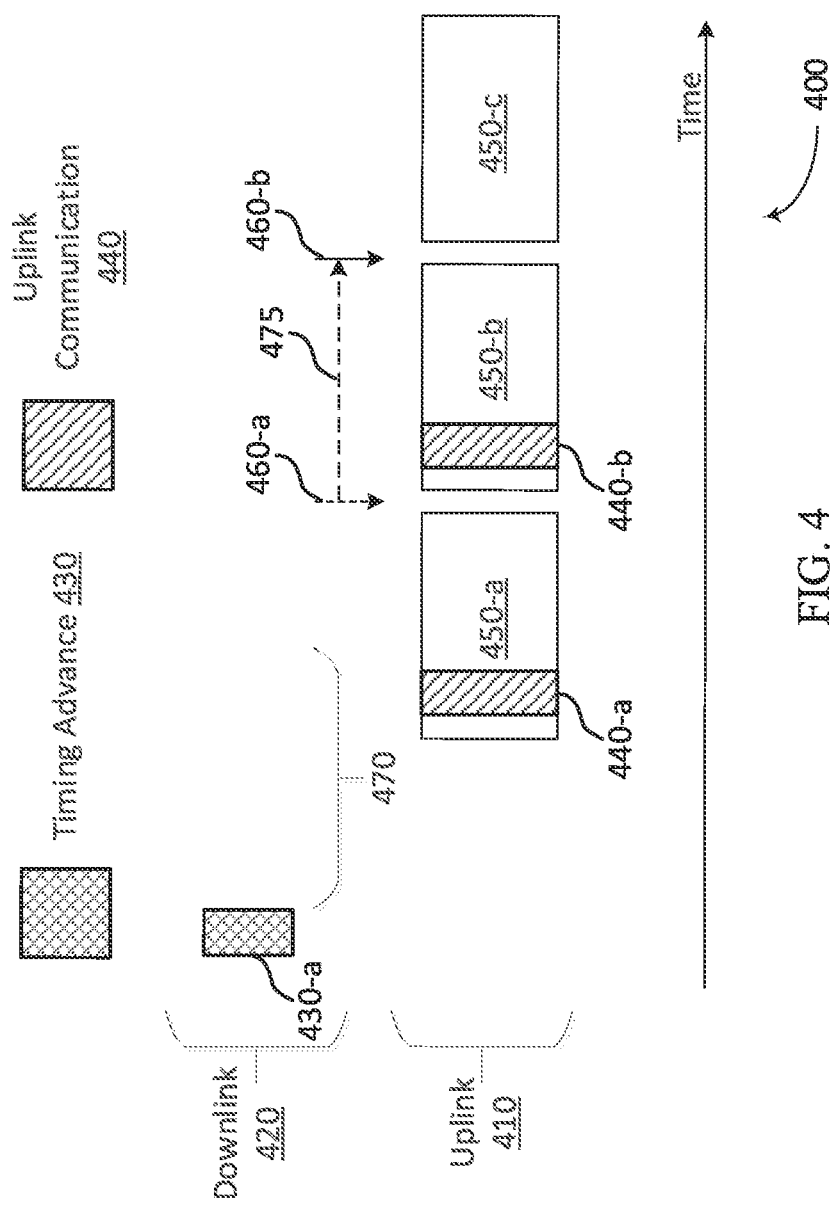
FIG. 4 illustrates uplink bundling and timing advance scheduling according to some aspects of the present disclosure.

FIG. 4 illustrates uplink bundling and timing advance scheduling 400 according to some aspects of the present disclosure. The uplink bundling and timing advance scheduling 400 of FIG. 4 may be similar to and implement aspects of uplink bundling and timing advance schedulings 200 and 300 of FIGS. 2 and 3. The uplink bundling and timing advance scheduling 400 of FIG. 4 illustrates aspects of one or more uplink channels 410 (e.g., physical uplink shared channel (PUSCH), physical uplink control channel (PUCCH), etc.), one or more downlink channels 420 (e.g., physical downlink shared channel (PDSCH), physical downlink control channel (PDCCH), etc.), a timing advance (TA) 430, and uplink communications 440 (e.g., PUSCH communications, PUCCH communications, demodulation reference signals (DMRSs), sounding reference signals (SRSs), etc.). In FIG. 4, the x-axis represents time in some arbitrary units as shown.

As shown, a TA 430-a is transmitted over the downlink channel(s) 420. In some instances, the TA 430-a is transmitted in a MAC CE over the PDSCH. After receiving the TA 430-a, the UE can implement the TA value by adjusting (e.g., delaying or advancing) its transmission timing.

As shown in FIG. 4, in some instances the TA 430-a is scheduled to be applied by the UE at a time 460-a. In some instances, the TA-430a is scheduled to be implemented by the UE starting with an uplink transmission that is at least a time gap 470 (e.g., T_gap) after the UE receives the TA 430-a. In some instances, the length of the time gap 470 is based on a TA processing time of the UE. Accordingly, the time 460-a at which the TA is scheduled to implemented by the UE can be based upon when the UE receives the TA 430-a from the BS, the time gap 470, a TA processing time of the UE, and/or a communication schedule of the UE. In the illustrated example of FIG. 4, the time gap 470 ends during slot 450-a where uplink communication 440-a is transmitted. Accordingly, in some instances the UE is scheduled to implement the TA 430-*a* prior to the slot 450-*b* and the transmission of the associated uplink communication 440-*b*.

In some instances, the UE determines whether to implement the TA 430-*a* at the time 460-*a* or delay the implementation to a later time, such as time 460-*b*. In some instances, the UE determines when to implement the TA 430-*a* based on a configuration. The configuration may be a dynamic configuration received from a BS (e.g., via RRC signaling, MAC CE, DCI, or otherwise) or a predetermined/ pre-programmed configuration stored in the memory of the UE. The configuration may provide one or more rules for the UE to utilize in determining when to implement the TA 430-*a*. In this regard, the rules may be based on whether bundled uplink communications are scheduled with phase coherence, the number of bundled uplink communications, the length of time necessary for the bundled uplink communications, a magnitude of the TA, one or more other factors, and/or combinations thereof. The configuration may also provide rules for the UE to utilize in selecting the timing for implementing the TA 430-*a* when the implementation is to be delayed from time 460-*a*. In this regard, the time 460-*b* can be selected based on one or more of an uplink-to-downlink switch, a downlink-to-uplink switch, a time gap between uplink communications, a power change between uplink communications, and/or the uplink communications not being scheduled with phase coherence.

In some instances, the configuration may dictate that the UE should transmit a certain number (e.g., 2, 3, 4, etc.) of bundled uplink communications scheduled with phase coherency prior to implementing the TA 430-*a*. The number of bundled uplink communications to transmit with phase coherency may be less than all the bundled uplink communications scheduled in some instances. As another example, the configuration may indicate that the UE should transmit any bundled uplink communications scheduled within a certain time period (e.g., number of slots, x ms, etc.) with phase coherency prior to implementing the TA 430-*a*. Again, the number of bundled uplink communications in the time period may be less than all the bundled uplink communications scheduled in some instances. In some instances, delay in implementing the TA 430-*a* may be partially based on the magnitude of the TA 430-*a*. In this regard, a smaller magnitude TA 430-*a* may be allowed a longer delay period for implementation than a larger magnitude TA 430-*a*. In some instances, if a magnitude of the TA 430-*a* is above a threshold, then the UE delays implementation of the TA; otherwise the UE applies the TA at 460-*a* and keeps the phase coherence across the uplink communications 440-*a* and 440-*b*. In some instances, the UE is configured to implement the TA 430-*a* following an uplink-to-downlink switch. In some instances, the UE is configured to implement the TA 430-*a* following a downlink-to-uplink switch. In some instances, the UE is configured to implement the TA 430-*a* when a gap (e.g., time and/or number of slots/sub-slots) between uplink communications exceeds a threshold. That is, if the gap between two uplink communications is sufficiently large the UE can implement the TA 430-*a*. In some instances, the UE is configured to implement the TA 430-*a* when there is a power change between uplink communications. In some instances, the UE is configured to implement the TA 430-*a* between uplink communications when the uplink communications are not scheduled with phase coherence.

As a result of delaying the implementation of the TA 430-*a* in accordance with any of the techniques discussed above, there can be a time gap 475 between the initially scheduled implementation time 460-*a* and the actual implementation time 460-*b*. In some instances, the time gap 475 may be a fixed and/or predetermined amount of time and operate in a similar manner to time gap 470. That is, the UE may implement the TA 430-*a* after the time gap 475 ends following the scheduled time 460-*a*. In some instances, the time gap 470 and/or the time gap 475 is implemented by the UE using a timer.

In the illustrated example of FIG. 4, the UE determines to delay the implementation of the TA 430-*a* from time 460-*a* to time 460-*b*. Accordingly, in some instances the uplink communication 440-*b* is transmitted before implementing the TA 430-*a*. In this regard, the uplink communication 440-*b* may be transmitted with phase coherence with the uplink communication 440-*a* as a result of delaying implementation of the TA 430-*a* until after transmitting the uplink communication 440-*b*. Therefore, the BS receiving the uplink communications 440-*a* and 440-*b* may process the uplink communications 440-*a* and 440-*b* jointly, instead of separately, because of the phase continuity.

In some instances, the BS determines when the TA 430-*a* was implemented by the UE based on the received uplink communications 440-*a* and 440-*b*, the TA processing capabilities of the UE, a configuration implemented by the UE, and/or other factors. In some instances, the timing of the implementation of the TA 430-*a* by the UE is based on a configuration, as discussed above. In some instances, the BS utilizes aspects of the configuration to estimate and/or determine when the UE will implement the TA 430-*a*. In this regard, as shown in the example of FIG. 4, the BS may determine that the UE will implement the TA 430-*a* at time 460-*b* and, therefore, determine to process the uplink communications 440-*a* and 440-*b* jointly.

Figure 5:
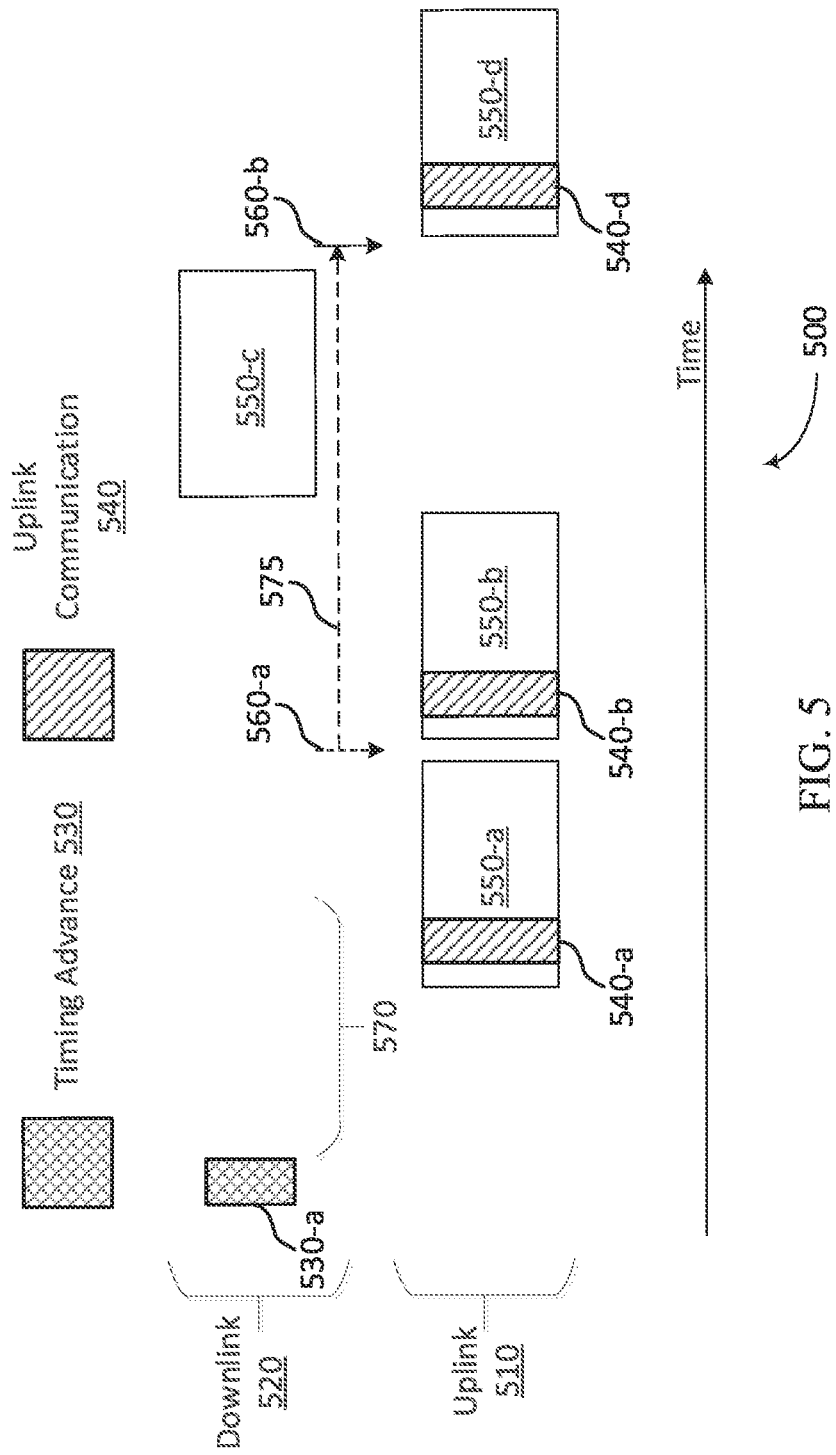
FIG. 5 illustrates uplink bundling and timing advance scheduling according to some aspects of the present disclosure.

FIG. 5 illustrates uplink bundling and timing advance scheduling 500 according to some aspects of the present disclosure. The uplink bundling and timing advance scheduling 500 of FIG. 5 may be similar to and implement aspects of uplink bundling and timing advance schedulings 200, 300, and 400 of FIGS. 2-4. The uplink bundling and timing advance scheduling 500 of FIG. 5 illustrates aspects of one or more uplink channels 510 (e.g., physical uplink shared channel (PUSCH), physical uplink control channel (PUCCH), etc.), one or more downlink channels 520 (e.g., physical downlink shared channel (PDSCH), physical downlink control channel (PDCCH), etc.), a timing advance (TA) 530, and uplink communications 540 (e.g., PUSCH communications, PUCCH communications, demodulation reference signals (DMRSs), sounding reference signals (SRSs), etc.). In FIG. 5, the x-axis represents time in some arbitrary units as shown.

As shown, a TA 530-*a* is transmitted over the downlink channel(s) 520. In some instances, the TA 530-*a* is transmitted in a MAC CE over the PDSCH. After receiving the TA 530-*a*, the UE can implement the TA value by adjusting (e.g., delaying or advancing) its transmission timing.

As shown in FIG. 5, in some instances the TA 530-*a* is scheduled to be applied by the UE at a time 560-*a*. In some instances, the TA-530*a* is scheduled to be implemented by the UE starting with an uplink transmission that is at least a time gap 570 (e.g., T_gap) after the UE receives the TA 530-*a*. In some instances, the length of the time gap 570 is based on a TA processing time of the UE. Accordingly, the time 560-*a* at which the TA is scheduled to implemented by the UE can be based upon when the UE receives the TA 530-*a* from the BS, the time gap 570, a TA processing time of the UE, and/or a communication schedule of the UE. In the illustrated example of FIG. 5, the time gap 570 ends during slot 550-*a* where uplink communication 540-*a* is transmitted. Accordingly, in some instances the UE is scheduled to implement the TA 530-*a* prior to the slot 550-*b* and the transmission of the associated uplink communication 540-*b*.

In some instances, the UE determines whether to implement the TA 530-*a* at the time 560-*a* or delay the implementation to a later time, such as time 560-*b*. In some instances, the UE determines when to implement the TA 530-*a* based on a configuration as discussed above with respect to FIGS. 3 and 4. In this regard, the configuration may provide one or more rules for the UE to utilize in determining when to implement the TA 530-*a*. In this regard, the rules may be based on whether bundled uplink communications are scheduled with phase coherence, the number of bundled uplink communications, the length of time necessary for the bundled uplink communications, a magnitude of the TA, one or more other factors, and/or combinations thereof. The configuration may also provide rules for the UE to utilize in selecting the timing for implementing the TA 530-*a* when the implementation is to be delayed from time 560-*a*. In this regard, the time 560-*b* can be selected based on one or more of an uplink-to-downlink switch, a downlink-to-uplink switch, a time gap between uplink communications, a power change between uplink communications, and/or the uplink communications not being scheduled with phase coherence.

FIG. 5 illustrates some examples of how the time 560-*b* can be selected in accordance with the present disclosure. For example, in some instances, the UE may be configured to transmit a certain number (e.g., 2, 3, 4, etc.) of bundled uplink communications scheduled with phase coherency prior to implementing the TA 530-*a*. The number of bundled uplink communications to transmit with phase coherency may be all or less than all the bundled uplink communications scheduled. For example, in FIG. 5 the UE may be configured to transmit both uplink communications 540-*a* and 540-*b* with phase coherency prior to implementing the TA 530-*a*.

As another example, the UE may be configured to transmit any bundled uplink communications scheduled within a certain time period (e.g., number of slots, x ms, etc.) with phase coherency prior to implementing the TA 530-*a*. Again, the number of bundled uplink communications in the time period may be less than all the bundled uplink communications scheduled in some instances. In FIG. 5, for example, the UE may be configured to transmit both uplink communications 540-*a* and 540-*b* with phase coherency during the allotted time period, then implement the TA 530-*a*. In some instances, the UE may be configured to determine the amount of allowable delay for implementing the TA 530-*a* based on the magnitude of the TA 530-*a*. In this regard, a smaller magnitude TA 530-*a* may be allowed a longer delay period for implementation than a larger magnitude TA 530-*a*. In some instances, if a magnitude of the TA 530-*a* is above a threshold, then the UE delays implementation of the TA 530-*a*; otherwise the UE applies the TA 530-*a* at 560-*a* and keeps the phase coherence across the uplink communications 540-*a* and 540-*b*.

In some instances, the UE may be configured to implement the TA 530-*a* following an uplink-to-downlink switch. In FIG. 5, for example, the UE may be configured to implement the TA 530-*a* following a switch from uplink slot 550-*b* to downlink slot 550-*c*. Accordingly, prior to the next uplink communication (e.g., uplink communication 540-*d*) and/or uplink slot (e.g., slot 550-*d*) following the uplink-to-downlink switch the UE can implement the TA 530-*a*.

In some instances, the UE may be configured to implement the TA 530-*a* following a downlink-to-uplink switch. In FIG. 5, for example, the UE may be configured to implement the TA 530-*a* following a switch from downlink slot 550-*c* to uplink slot 550-*d*. Accordingly, prior to the next uplink communication (e.g., uplink communication 540-*d*) and/or the uplink slot (e.g., slot 550-*d*) following the downlink-to-uplink switch the UE can implement the TA 530-*a*.

In some instances, the UE may be configured to implement the TA 530-*a* when a gap (e.g., time and/or number of slots/sub-slots) between uplink communications exceeds a threshold. That is, if the gap between two uplink communications is sufficiently large the UE can implement the TA 530-*a*. In FIG. 5, for example, the UE may be configured to implement the TA 530-*a* between uplink communications 540-*b* and 540-*d* because the gap satisfies a threshold (e.g., 1 slot), whereas the gap between uplink communications 540-*a* and 540-*b* does not satisfy the threshold.

In some instances, the UE may be configured to implement the TA 530-*a* when there is a power change between uplink communications. In FIG. 5, for example, the UE may be configured to implement the TA 530-*a* between uplink communications 540-*b* and 540-*d* because of power change or difference between the uplink communications 540-*b* and 540-*d*, whereas uplink communications 540-*a* and 540-*b* may be transmitted using the same power level.

In some instances, the UE may be configured to implement the TA 530-*a* between uplink communications when the uplink communications are not scheduled with phase coherence. In FIG. 5, for example, the UE may be configured to implement the TA 530-*a* between uplink communications 540-*b* and 540-*d* because of the uplink communications 540-*b* and 540-*d* are not scheduled with phase coherency, whereas uplink communications 540-*a* and 540-*b* may be scheduled with phase coherency.

As a result of delaying the implementation of the TA 530-*a* in accordance with any of the techniques discussed above, there can be a time gap 575 between the initially scheduled implementation time 560-*a* and the actual implementation time 560-*b*. In some instances, the time gap 575 may be a fixed and/or predetermined amount of time and operate in a similar manner to time gap 570. That is, the UE may implement the TA 530-*a* after the time gap 575 ends following the scheduled time 560-*a*. In some instances, the time gap 570 and/or the time gap 575 is implemented by the UE using a timer.

In the illustrated example of FIG. 5, the UE determines to delay the implementation of the TA 530-*a* from time 560-*a* to time 560-*b*. Accordingly, in some instances the uplink communication 540-*b* is transmitted before implementing the TA 530-*a*. In this regard, the uplink communication 540-*b* may be transmitted with phase coherence with the uplink communication 540-*a* as a result of delaying implementation of the TA 530-*a* until after transmitting the uplink communication 540-*b*. Therefore, the BS receiving the uplink communications 540-*a* and 540-*b* may process the uplink communications 540-*a* and 540-*b* jointly, instead of separately, because of the phase continuity.

In some instances, the BS determines when the TA 530-*a* was implemented by the UE based on the received uplink communications 540-*a* and 540-*b*, the TA processing capabilities of the UE, a configuration implemented by the UE, and/or other factors. In some instances, the timing of the implementation of the TA 530-*a* by the UE is based on a configuration, as discussed above. In some instances, the BS utilizes aspects of the configuration to estimate and/or determine when the UE will implement the TA 530-*a*. In this regard, as shown in the example of FIG. 5, the BS may determine that the UE will implement the TA 530-*a* at time 560-*b* and, therefore, determine to process the uplink communications 540-*a* and 540-*b* jointly.

Figure 6:
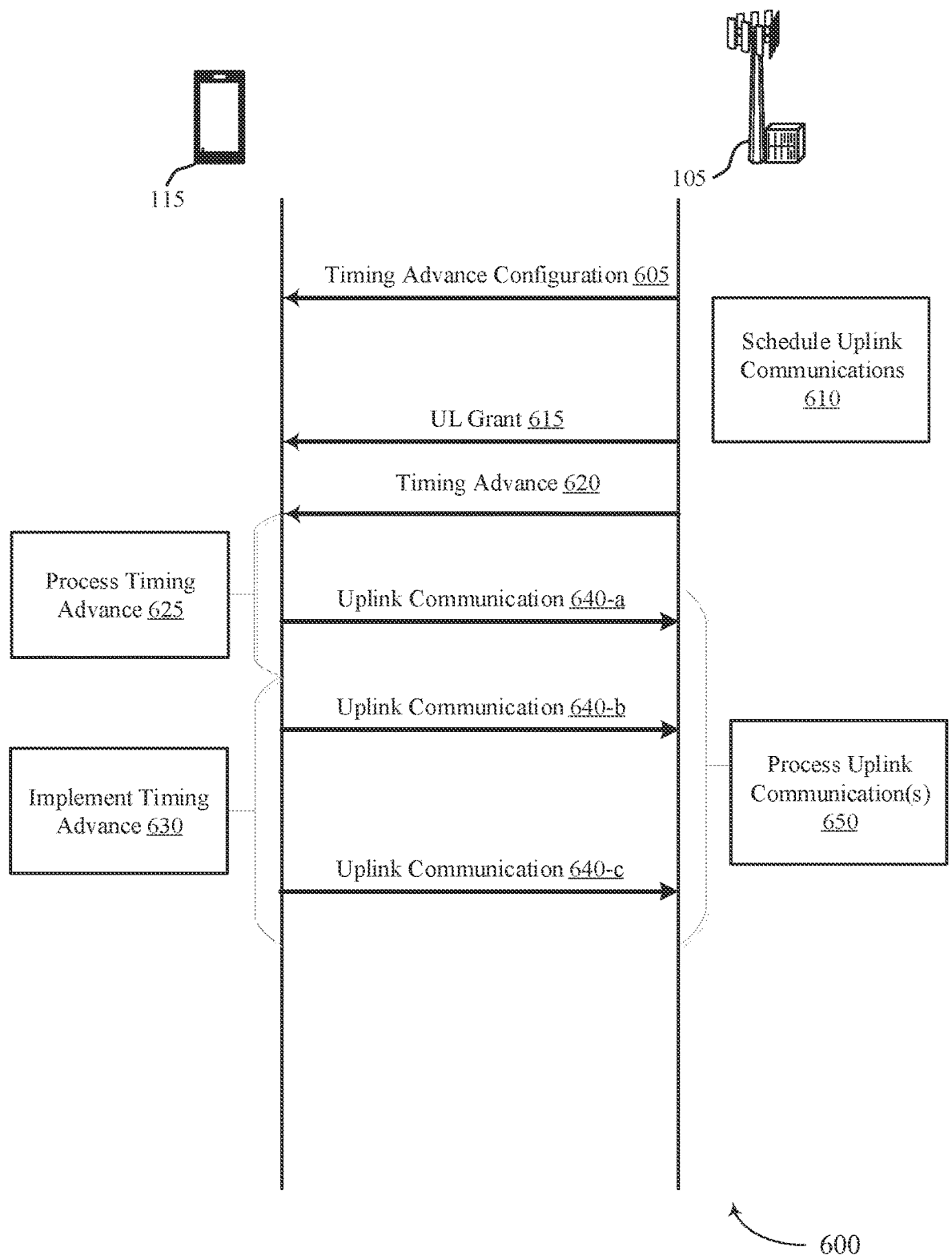
FIG. 6 illustrates a signal diagram illustrating uplink bundling and timing advance communications according to some aspects of the present disclosure.

FIG. 6 illustrates a signal diagram 600 illustrating uplink bundling and timing advance communications according to some aspects of the present disclosure. Aspects of the signal diagram 600 can be used for the uplink bundling and timing advance schedulings 200, 300, 400, and 500 of FIGS. 2-5.

At 605, the BS 105 transmits a timing advance configuration to the UE 115. In some instances, the timing advance configuration is a dynamic configuration determined by the BS. The timing advance configuration may be transmitted to the UE 115 via RRC signaling, MAC CE, DCI, or other suitable communication. In some instances, the BS 105 does not transmit the timing advance configuration to the UE 115. For example, the configuration may be a predetermined/pre-programmed configuration stored in the memory of the UE in some instances. The timing advance configuration, at 605, can indicate when to delay implementation of a TA in accordance with the present disclosure. In this regard, the timing advance configuration may provide one or more rules for determining when to implement the TA. In this regard, the configuration may be based on whether bundled uplink communications are scheduled with phase coherence, the number of bundled uplink communications, the length of time necessary for the bundled uplink communications, a magnitude of the TA, one or more other factors, and/or combinations thereof. Further, the configuration, at 605, may provide one or more rules for determining the timing for implementing the TA when the TA implementation will be delayed. In this regard, the timing of the delayed implementation can be based on one or more of an uplink-to-downlink switch, a downlink-to-uplink switch, a time gap between the second uplink communication and a third uplink communication, a power change between the second uplink communication and the third uplink communication, and/or the third uplink communication not being scheduled with phase coherence with the first uplink communication and/or the second uplink communication.

At 610, the BS 105 can schedule uplink communications for the UE 115. In this regard, the BS 105 may allocate resources to the UE 115 for use by the UE 115 in transmitting uplink communications. The allocated resources can include time and frequency resources that can be utilized by the UE 115 for any suitable communications, including without limitation DMRS, SRS, PUCCH, PUSCH, and other uplink communications. At 615, the BS 105 can indicate the resources allocated to the UE 115 via an uplink grant.

At 620, the BS 105 transmits a timing advance (TA) to the UE 115. In some instances, the TA is transmitted, at 620, via a media access control control element (MAC CE) communication (e.g., via PDSCH) or other suitable communication. As discussed above, in some instances the TA is scheduled to be implemented by the UE at a time that is after the start of a first uplink communication of a group of bundled uplink communications scheduled with phase coherence, but before the start of a second uplink communication of the group of bundled uplink communications (see, e.g., FIGS. 2-5). In some instances, the time at which the TA is scheduled to be implemented by the UE is based on when the UE receives the TA from the BS, a TA processing time of the UE, and/or a communication schedule of the UE. In some instances, the UE may transmit a capability report indicating the BS the TA processing time of the UE and/or other information allowing the BS to determine when the UE will be scheduled to implement the TA based on when the BS transmits the TA to the UE.

At 625, the UE 115 processes the TA. In some instances, the UE processes the TA to determine a TA value and/or when to implement the TA. In this regard, the UE can determine whether to implement the TA at the first time or a second time, the second time being after transmission of the second uplink communication. In some instances, the UE determines whether to implement the TA at an initially scheduled time or delay the implementation to a later time in accordance with the present disclosure (see, e.g., FIGS. 2-5).

At 630, the UE 115 implements the TA based on the processing of the TA at 625. In this regard, the UE 115 may implement the TA at a suitable time relative to the uplink communications 640-*a*, 640-*b*, and/or 640-*c*. In some instances, two or more of the uplink communications 640-*a*, 640-*b*, and/or 640-*c* are bundled and scheduled to be transmitted with phase coherence. The uplink communications 640-*a*, 640-*b*, and/or 640-*c* can include at least one of a demodulation reference signal (DMRS), a sounding reference signal (SRS), a physical uplink control channel (PUCCH) communication, a physical uplink shared channel (PUSCH) communication, and/or another uplink communication. In some instances, the uplink communications 640-*a*, 640-*b*, and/or 640-*c* are each the same type of uplink communication (e.g., DMRS, SRS, etc.). In some instances, at least one of the uplink communications 640-*a*, 640-*b*, and/or 640-*c* includes a different type of uplink communication than one of the other uplink communications 640-*a*, 640-*b*, and/or 640-*c*.

In some instances, at step 630, the UE 115 determines to implement the TA at an initially scheduled time between the uplink communication 640-*a* and the uplink communication 640-*b* (see, e.g., FIG. 3). Accordingly, in some instances the uplink communication 640-*b* is transmitted by the UE 115 after implementing the TA. In this regard, the uplink communication 640-*b* may be transmitted without phase coherence with the uplink communication 640-*a*. Therefore, the BS 105 may process, at 650, the uplink communications 640-*a* and 640-*b* separately, instead of jointly, even if the uplink communications 640-*a* and 640-*b* were initially scheduled to be transmitted with phase coherence.

In some instances, at step 630, the UE 115 determines to delay implementation of the TA from an initially scheduled time between the uplink communication 640-*a* and the uplink communication 640-*b* to a later time (see, e.g., FIGS. 4 and 5). Accordingly, in some instances the uplink communication 640-*b* is transmitted by the UE 115 before implementing the TA. In this regard, the uplink communication 640-*b* may be transmitted with phase coherence with the uplink communication 640-*a* as a result of delaying the implementation of the TA until after transmitting the uplink communication 640-*b*. Therefore, the BS 105, at 650, may process the uplink communications 640-*a* and 640-*b* jointly, instead of separately.

Figure 7:
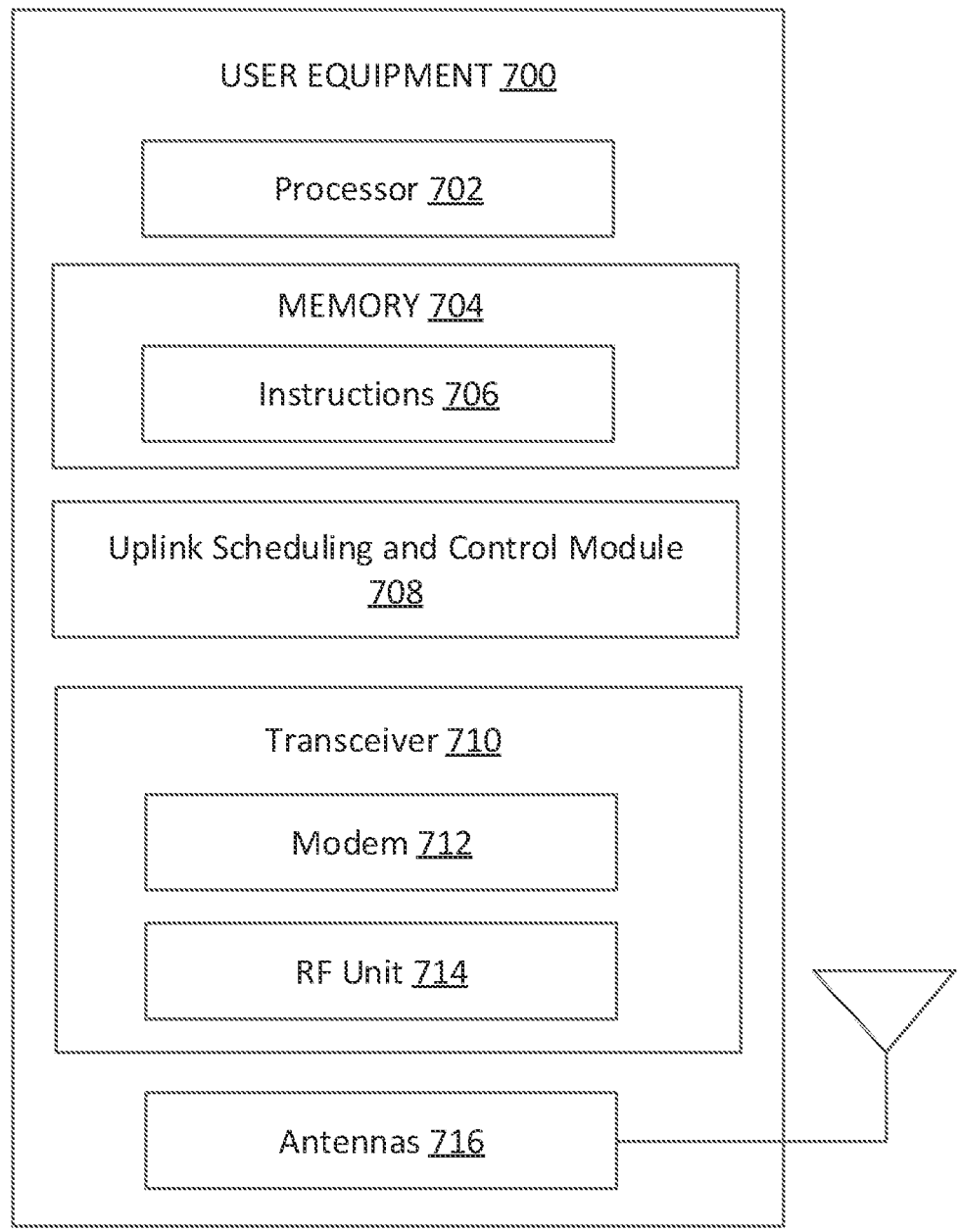
FIG. 7 is a block diagram of a user equipment (UE) according to some aspects of the present disclosure.

FIG. 7 is a block diagram of an exemplary UE 700 according to aspects of the present disclosure. The UE 700 may be a UE 115 as discussed above in FIG. 1. As shown, the UE 700 may include a processor 702, a memory 704, an uplink scheduling and control module 708, a transceiver 710 including a modem subsystem 712 and a radio frequency (RF) unit 714, and one or more antennas 716. These elements may be in direct or indirect communication with each other, for example via one or more buses.

The processor 702 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 702 may also be implemented as a combination of computing devices, e.g., a combination of a DSP and a microprocessor, a plurality of microprocessors, one or more microprocessors in conjunction with a DSP core, or any other such configuration.

The memory 704 may include a cache memory (e.g., a cache memory of the processor 702), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 704 includes a non-transitory computer-readable medium. The memory 704 may store, or have recorded thereon, instructions 706. The instructions 706 may include instructions that, when executed by the processor 702, cause the processor 702 to perform the operations described herein with reference to the UEs 115 in connection with aspects of the present disclosure, for example, aspects of FIGS. 3-6 and 9. Instructions 706 may also be referred to as program code. The program code may be for causing a wireless communication device (or specific component(s) of the wireless communication device) to perform these operations, for example by causing one or more processors (such as processor 702) to control or command the wireless communication device (or specific component(s) of the wireless communication device) to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The uplink scheduling and control module 708 may be implemented via hardware, software, or combinations thereof. For example, uplink scheduling and control module 708 may be implemented as a processor, circuit, and/or instructions 706 stored in the memory 704 and executed by the processor 702. In some examples, the uplink scheduling and control module 708 can be integrated within the modem subsystem 712. For example, the uplink scheduling and control module 708 can be implemented by a combination of software components (e.g., executed by a DSP or a general processor) and hardware components (e.g., logic gates and circuitry) within the modem subsystem 712.

The uplink scheduling and control module 708 may be used for various aspects of the present disclosure, for example, aspects of FIGS. 3-6 and 9. The uplink scheduling and control module 708 is configured to communicate with other components of the UE 700 to receive a TA configuration, process the TA configuration, receive a TA, receive a MAC CE, determine when to implement the TA, implement the TA, transmit uplink communications (e.g., DMRS, SRS, PUCCH, PUSCH, etc.), perform PDCCH monitoring, perform PDSCH monitoring, determine whether a timer has expired, cancel a timer, determine whether a condition has occurred or is met, and/or perform other functionalities related to the uplink bundling and TA configurations and associated wireless communication techniques of a UE described in the present disclosure.

As shown, the transceiver 710 may include the modem subsystem 712 and the RF unit 714. The transceiver 710 can be configured to communicate bi-directionally with other devices, such as the BSs 105. The modem subsystem 712 may be configured to modulate and/or encode the data from the memory 704, and/or the uplink scheduling and control module 708 according to a modulation and coding scheme (MCS) (e.g., a low-density parity check (LDPC) coding scheme, a turbo coding scheme, a convolutional coding scheme, a digital beamforming scheme, etc.). The RF unit 714 may be configured to process (e.g., perform analog to digital conversion or digital to analog conversion, etc.) modulated/encoded data (e.g., UL control information, UL data) from the modem subsystem 712 (on outbound transmissions) or of transmissions originating from another source such as a UE 115 or a BS 105. The RF unit 714 may be further configured to perform analog beamforming in conjunction with the digital beamforming. Although shown as integrated together in transceiver 710, the modem subsystem 712 and the RF unit 714 may be separate devices that are coupled together at the UE 115 to enable the UE 115 to communicate with other devices.

The RF unit 714 may provide the modulated and/or processed data (e.g., data packets or, more generally, data messages that may contain one or more data packets and other information) to the antennas 716 for transmission to one or more other devices. The antennas 716 may further receive data messages transmitted from other devices. The antennas 716 may provide the received data messages for processing and/or demodulation at the transceiver 710. The transceiver 710 may provide the demodulated and decoded data (e.g., PDCCH signals, radio resource control (RRC) signals, media access control (MAC) control element (CE) signals, DCI, PDSCH signals, DL/UL scheduling grants, DL data, etc.) to the uplink scheduling and control module 708 for processing. The antennas 716 may include multiple antennas of similar or different designs in order to sustain multiple transmission links. The RF unit 714 may configure the antennas 716. The RF unit 714 and/or the transceiver 710 may include components and/or circuitries that can be powers on and/or off dynamically for power savings. Additionally, or alternatively, the RF unit 714 and/or the transceiver 710 may include components and/or circuitries with multiple power states that can be configured to transition from one power state (e.g., a higher-power state) to another power state (e.g., a lower-power state) for power savings.

In an embodiment, the UE 700 can include multiple transceivers 710 implementing different RATs (e.g., NR and LTE). In an embodiment, the UE 700 can include a single transceiver 710 implementing multiple RATs (e.g., NR and LTE). In an embodiment, the transceiver 710 can include various components, where different combinations of components can implement different RATs.

Figure 8:
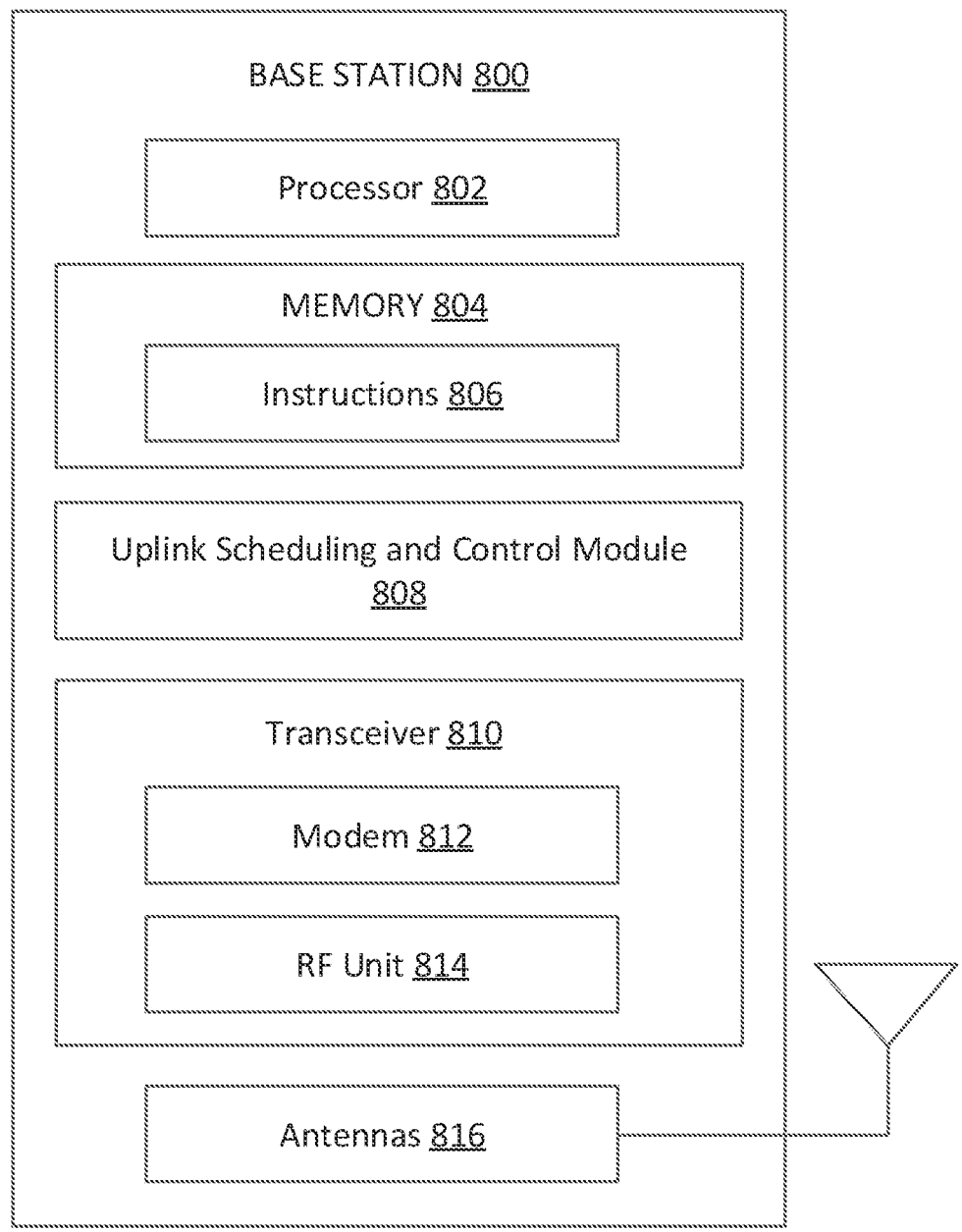
FIG. 8 is a block diagram of an exemplary base station (BS) according to aspects of the present disclosure.

FIG. 8 is a block diagram of an exemplary BS 800 according to aspects of the present disclosure. The BS 800 may be a BS 105 as discussed above in FIG. 1. As shown, the BS 800 may include a processor 802, a memory 804, an uplink scheduling and control module 808, a transceiver 810 including a modem subsystem 812 and a RF unit 814, and one or more antennas 816. These elements may be in direct or indirect communication with each other, for example via one or more buses.

The processor 802 may have various features as a specific-type processor. For example, these may include a CPU, a DSP, an ASIC, a controller, a FPGA device, another hardware device, a firmware device, or any combination thereof configured to perform the operations described herein. The processor 802 may also be implemented as a combination of computing devices, e.g., a combination of a DSP and a microprocessor, a plurality of microprocessors, one or more microprocessors in conjunction with a DSP core, or any other such configuration.

The memory 804 may include a cache memory (e.g., a cache memory of the processor 802), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some instances, the memory 804 may include a non-transitory computer-readable medium. The memory 804 may store instructions 806. The instructions 806 may include instructions that, when executed by the processor 802, cause the processor 802 to perform operations described herein, for example, aspects of FIGS. 3-6 and 10. Instructions 806 may also be referred to as code, which may be interpreted broadly to include any type of computer-readable statement(s) as discussed above.

The uplink scheduling and control module 808 may be implemented via hardware, software, or combinations thereof. For example, the uplink scheduling and control module 808 may be implemented as a processor, circuit, and/or instructions 806 stored in the memory 804 and executed by the processor 802. In some examples, the uplink scheduling and control module 808 can be integrated within the modem subsystem 812. For example, the uplink scheduling and control module 808 can be implemented by a combination of software components (e.g., executed by a DSP or a general processor) and hardware components (e.g., logic gates and circuitry) within the modem subsystem 812.

The uplink scheduling and control module 808 may be used for various aspects of the present disclosure, for example, aspects of FIGS. 3-6 and 10. The uplink scheduling and control module 808 can be configured to determine a TA configuration for one or more UEs, transmit the TA configuration to the one or more UEs, perform uplink scheduling for the one or more UEs, generate TAs for the one or more UEs, transmit the TAs to the one or more UEs, transmit MAC CE, transmit PDCCH communications, transmit PDSCH communications, determine when a UE has or will implement the TA, monitor for uplink communications (e.g., DMRS, SRS, PUCCH, PUSCH, etc.), process uplink communications (either separately or jointly), determine whether a timer has expired, cancel a timer, determine whether a condition has occurred or is met, and/or perform other functionalities related to the uplink bundling and TA configurations and associated wireless communication techniques of a base station described in the present disclosure.

As shown, the transceiver 810 may include the modem subsystem 812 and the RF unit 814. The transceiver 810 can be configured to communicate bi-directionally with other devices, such as the UEs 115 and/or 700 and/or another core network element. The modem subsystem 812 may be configured to modulate and/or encode data according to a MCS (e.g., a LDPC coding scheme, a turbo coding scheme, a convolutional coding scheme, a digital beamforming scheme, etc.). The RF unit 814 may be configured to process (e.g., perform analog to digital conversion or digital to analog conversion, etc.) modulated/encoded data (e.g., PDCCH signals, RRC signals, MAC CE signals, DCI, PDSCH signals, etc.) from the modem subsystem 812 (on outbound transmissions) or of transmissions originating from another source, such as a UE 115 or 700. The RF unit 814 may be further configured to perform analog beamforming in conjunction with the digital beamforming. Although shown as integrated together in transceiver 810, the modem subsystem 812 and/or the RF unit 814 may be separate devices that are coupled together at the BS 105 to enable the BS 105 to communicate with other devices.

The RF unit 814 may provide the modulated and/or processed data, (e.g., data packets or, more generally, data messages that may contain one or more data packets and other information) to the antennas 816 for transmission to one or more other devices. This may include, for example, transmission of information to a UE 115 or 700 according to aspects of the present disclosure. The antennas 816 may further receive data messages transmitted from other devices and provide the received data messages for processing and/or demodulation at the transceiver 810. The transceiver 810 may provide the demodulated and decoded data (e.g., RACH message(s), ACK/NACKs for PDCCH signals, UL data, ACK/NACKs for DL data, etc.) to the uplink scheduling and control module 808 for processing. The antennas 816 may include multiple antennas of similar or different designs in order to sustain multiple transmission links.

In an embodiment, the BS 800 can include multiple transceivers 810 implementing different RATs (e.g., NR and LTE). In an embodiment, the BS 800 can include a single transceiver 810 implementing multiple RATs (e.g., NR and LTE). In an embodiment, the transceiver 810 can include various components, where different combinations of components can implement different RATs.

Figure 9:
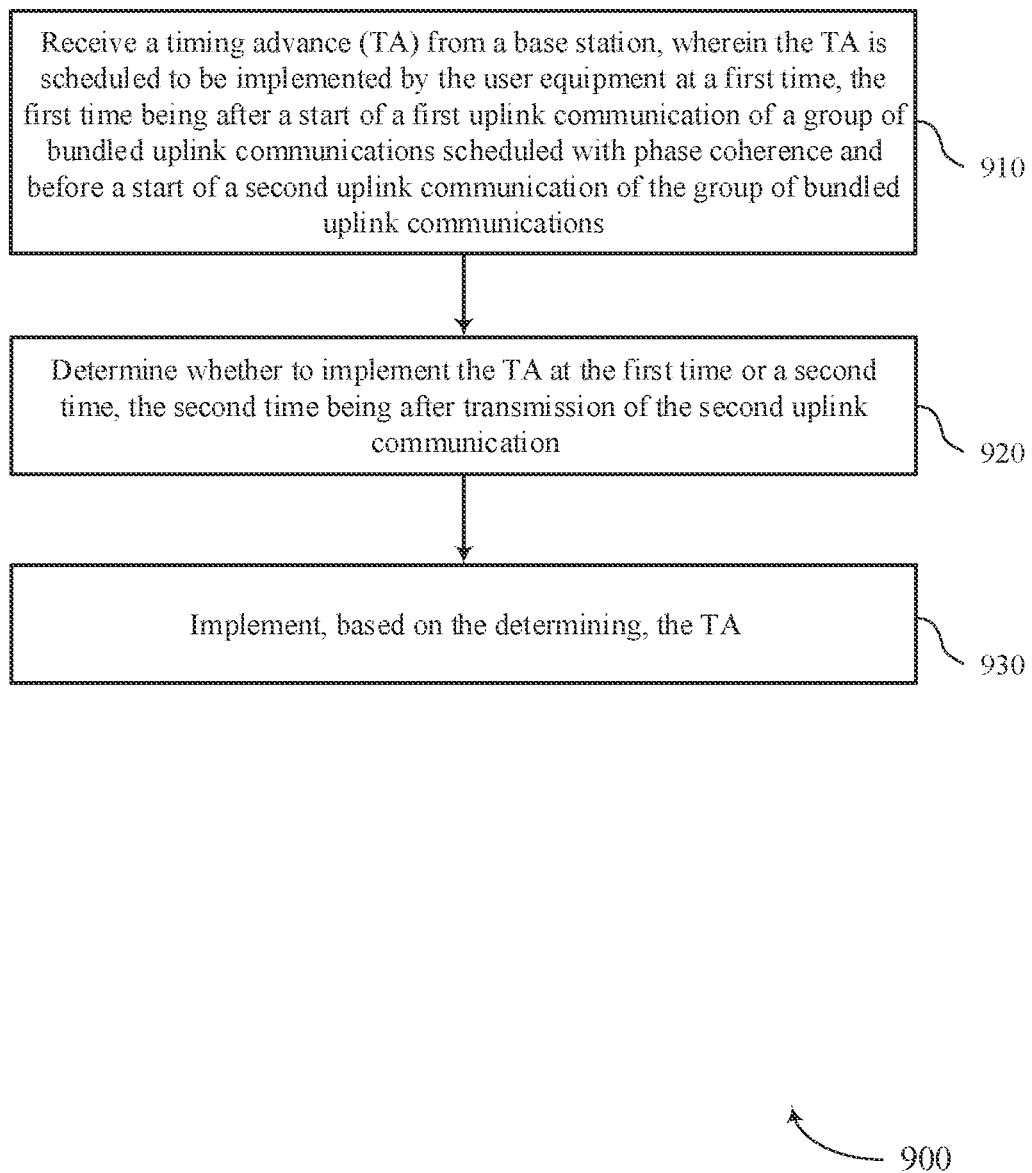
FIG. 9 illustrates a flow diagram of a wireless communication method according to some aspects of the present disclosure.

FIG. 9 is a flow diagram of a communication method 900 according to some aspects of the present disclosure. Aspects of the method 900 can be executed by a wireless communication device, such as the UEs 115 and/or 700 utilizing one or more components, such as the processor 702, the memory 704, the uplink scheduling and control module 708, the transceiver 710, the modem 712, the one or more antennas 716, and various combinations thereof. As illustrated, the method 900 includes a number of enumerated steps, but the method 900 may include additional steps before, after, and in between the enumerated steps. For example, in some instances one or more aspects of uplink bundling and timing advance schedulings 200, 300, 400, and/or 500 and/or signaling diagram 600 may be implemented as part of method 900. In some instances, one or more of the enumerated steps may be omitted or performed in a different order.

At step 910, the method 900 includes the UE receiving, from a BS, a timing advance (TA). In some instances, the TA is received via a media access control control element (MAC CE) communication (e.g., via PDSCH) or other suitable communication from the BS. In some instances, the TA is scheduled to be implemented by the UE at a time that is after the start of a first uplink communication of a group of bundled uplink communications scheduled with phase coherence, but before the start of a second uplink communication of the group of bundled uplink communications (see, e.g., FIGS. 2-5). In some instances, the time at which the TA is scheduled to be implemented by the UE is based on when the UE receives the TA from the BS, a TA processing time of the UE, and/or a communication schedule of the UE. In some instances, the UE may transmit a capability report indicating the BS the TA processing time of the UE and/or other information allowing the BS to determine when the UE will be scheduled to implement the TA based on when the BS transmits the TA to the UE.

The first uplink communication can include at least one of a demodulation reference signal (DMRS), a sounding reference signal (SRS), a physical uplink control channel (PUCCH) communication, a physical uplink shared channel (PUSCH) communication, and/or another uplink communication. The second uplink communication can include at least one of a DMRS, an SRS, a PUCCH communication, a PUSCH communication, and/or another uplink communication. In some instances, the first and second uplink communications are the same type of uplink communication (e.g., DMRS and DMRS, SRS and SRS, etc.). In some instances, the first and second uplink communications are the different types of uplink communications (e.g., DMRS and SRS, DMRS and PUSCH communication, SRS and PUCCH communication, PUCCH communication and PUSCH communication, etc.). Accordingly, the bundled uplink communications scheduled with phase coherence may include the same and/or different types of uplink communications.

At step 920, the method 900 includes the UE determining whether to implement the TA at the first time or a second time, the second time being after transmission of the second uplink communication. In some instances, the UE determines whether to implement the TA at the first time or the second time based on a configuration. The configuration may be a dynamic configuration received from the BS (e.g., via RRC signaling, MAC CE, DCI, or otherwise) or a predetermined/pre-programmed configuration stored in the memory of the UE. In this regard, the method 900 can include the UE receiving, from the BS, a configuration indicating when to delay implementation of the TA from the first time to the second time. The configuration may provide one or more rules for the UE to utilize in determining when to implement the TA at the first time and when to delay implementing the TA to a second time. In this regard, the rules may be based on whether bundled uplink communications are scheduled with phase coherence, the number of bundled uplink communications, the length of time necessary for the bundled uplink communications, a magnitude of the TA (e.g., if the TA has a magnitude greater than a threshold, then the TA is implemented at the first time), one or more other factors, and/or combinations thereof.

Further, the configuration may provide rules for the UE to utilize in selecting the timing of the second time when the TA implementation is to be delayed. In this regard, the timing of the second time can be based on one or more of an uplink-to-downlink switch, a downlink-to-uplink switch, a time gap between the second uplink communication and a third uplink communication, a power change between the second uplink communication and the third uplink communication, and/or the third uplink communication not being scheduled with phase coherence with the first uplink communication and/or the second uplink communication.

At step 930, the method 900 includes the UE implementing the TA based on the determining. In this regard, the UE may implement the TA at the first time or delay implementation of the TA to a later time (e.g., the second time). When the UE implements the TA, the UE adjusts its transmission timing in accordance with the TA received from the BS. In this regard, implementing the TA helps to ensure that the UE and the BS are in synchronization and, as a result, that the UE's uplink communications are successfully received by the BS.

In some instances, the method 900 includes determining, at step 920, to implement the TA at the first time and implementing, at step 930, the TA at the first time. Accordingly, in some instances the second uplink communication is transmitted after implementing the TA. In this regard, the second uplink communication may be transmitted without phase coherence with the first uplink communication as a result of implementing the TA prior to transmitting the second uplink communication. Therefore, the BS receiving the first and second uplink communications may process the first and second uplink communications separately, instead of jointly.

In some instances, the method 900 includes the UE determining, at step 920, to implement the TA at the second time and implementing, at step 930, the TA at the second time. Accordingly, in some instances the second uplink communication is transmitted before implementing the TA. In this regard, the second uplink communication may be transmitted with phase coherence with the first uplink communication as a result of implementing the TA after transmitting the second uplink communication. Therefore, the BS receiving the first and second uplink communications may process the first and second uplink communications jointly, instead of separately.

In some instances, the method 900 includes the UE determining a timing for the second time. For example, the timing of the second time can be based on one or more of an uplink-to-downlink switch, a downlink-to-uplink switch, a time gap between the second uplink communication and a third uplink communication, a power change between the second uplink communication and the third uplink communication, and/or whether the third uplink communication is scheduled with phase coherence with the first uplink communication and/or the second uplink communication. In this regard, the UE may determine to implement the TA after an uplink-to-downlink switch occurs, after a downlink-to-uplink switch occurs, when a time gap between the second uplink communication and a third uplink communication satisfies a threshold amount, when there is a power change between the second uplink communication and the third uplink communication, and/or prior to the third uplink communication when the third uplink communication is not scheduled with phase coherence with the first uplink communication and/or the second uplink communication. In some instances, the UE implements the TA prior to an uplink transmission following the occurrence of one or more of these events. That is, upon occurrence of one or more of these events, the UE may delay implementing the TA until closer in time to when the UE is scheduled to transmit an uplink communication.

Figure 10:
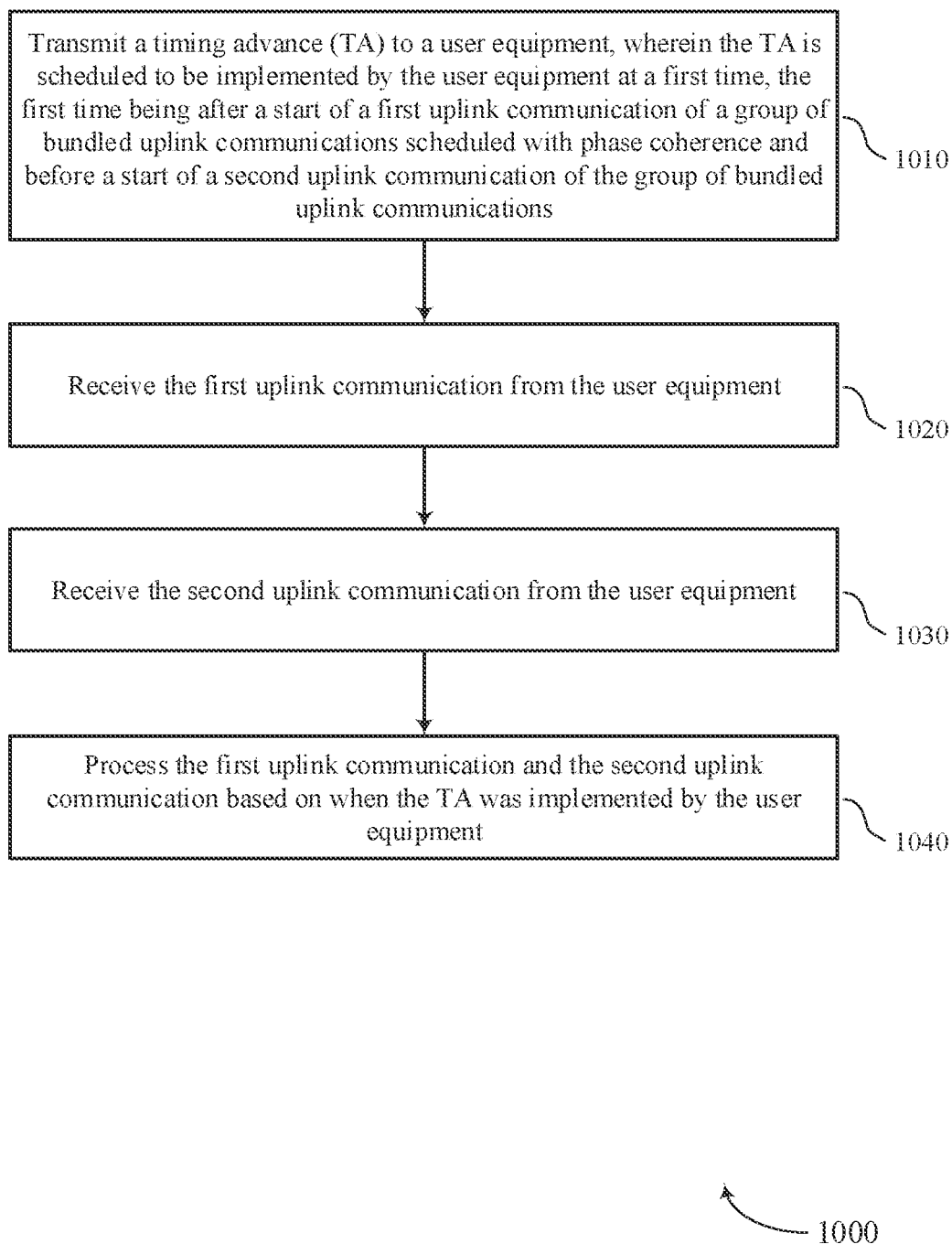
FIG. 10 illustrates a flow diagram of a wireless communication method according to some aspects of the present disclosure.

FIG. 10 is a flow diagram of a communication method 1000 according to some aspects of the present disclosure. Aspects of the method 1000 can be executed by a wireless communication device, such as the BSs 105 and/or 800 utilizing one or more components, such as the processor 802, the memory 804, the uplink scheduling and control module 808, the transceiver 810, the modem 812, the one or more antennas 816, and various combinations thereof. As illustrated, the method 1000 includes a number of enumerated steps, but the method 1000 may include additional steps before, after, and in between the enumerated steps. For example, in some instances one or more aspects of uplink bundling and timing advance schedulings 200, 300, 400, and/or 500 and/or signaling diagram 600 may be implemented as part of method 1000. In some instances, one or more of the enumerated steps may be omitted or performed in a different order.

At step 1010, the method 1000 includes the BS transmitting, to a UE, a timing advance (TA). In some instances, the TA is transmitted to the UE via a media access control control element (MAC CE) communication (e.g., via PDSCH) or other suitable communication. In some instances, the TA is scheduled to be implemented by the UE after the start of a first uplink communication of a group of bundled uplink communications scheduled with phase coherence and before the start of a second uplink communication of the group of bundled uplink communications (see, e.g., FIGS. 2-5). In some instances, the time at which the TA is scheduled to be implemented by the UE is based on when the UE receives the TA from the BS, a TA processing time of the UE, and/or a communication schedule of the UE. In some instances, the BS may receive a capability report from the UE indicating the TA processing time of the UE and/or other information allowing the BS to determine when the UE will be scheduled to implement the TA based on when the BS transmits the TA to the UE.

At step 1020, the method 1000 includes the BS receiving, from the UE, the first uplink communication. The first uplink communication can include at least one of a demodulation reference signal (DMRS), a sounding reference signal (SRS), a physical uplink control channel (PUCCH) communication, a physical uplink shared channel (PUSCH) communication, and/or another uplink communication.

At step 1030, the method 1000 includes the BS receiving, from the UE, the second uplink communication. The second uplink communication can include at least one of a DMRS, an SRS, a PUCCH communication, a PUSCH communication, and/or another uplink communication.

In some instances, the first and second uplink communications are the same type of uplink communication (e.g., DMRS and DMRS, SRS and SRS, etc.). In some instances, the first and second uplink communications are the different types of uplink communications (e.g., DMRS and SRS, DMRS and PUSCH communication, SRS and PUCCH communication, PUCCH communication and PUSCH communication, etc.). Accordingly, the bundled uplink communications scheduled with phase coherence may include the same and/or different types of uplink communications.

At step 1040, the method 1000 includes the BS processing the first uplink communication and the second uplink communication based on when the TA was implemented by the UE. In some instances, the BS determines when the TA was implemented by the UE based on the received first and second uplink communication signals, the TA processing capabilities of the UE, a configuration implemented by the UE, and/or other factors. In some instances, the timing of the implementation of the TA is based on a configuration. The configuration may be a dynamic configuration determined by the BS and transmitted to the UE (e.g., via RRC signaling, MAC CE, DCI, or otherwise) or a predetermined/preprogrammed configuration stored in the memory of the BS and/or UE. In this regard, the method 1000 can include the BS transmitting, to the UE, a configuration indicating when to delay implementation of the TA from the first time to the second time.

The configuration may provide one or more rules for determining when to implement the TA at the first time and when to delay implementing the TA to a second time. In this regard, the rules may be based on whether bundled uplink communications are scheduled with phase coherence, the number of bundled uplink communications, the length of time necessary for the bundled uplink communications, a magnitude of the TA (e.g., if the TA has a magnitude greater than a threshold, then the TA is implemented at the first time), one or more other factors, and/or combinations thereof. Further, the configuration may provide rules for selecting the timing for implementing the TA when the TA implementation is to be delayed. In this regard, the timing of the TA implementation can be based on one or more of an uplink-to-downlink switch, a downlink-to-uplink switch, a time gap between the second uplink communication and a third uplink communication, a power change between the second uplink communication and the third uplink communication, and/or the third uplink communication not being scheduled with phase coherence with the first uplink communication and/or the second uplink communication.

In some instances, the BS utilizes aspects of the configuration to estimate and/or determine when the UE will implement the TA. For example, the BS may determine that the UE will implement the TA after an uplink-to-downlink switch occurs, after a downlink-to-uplink switch occurs, when a time gap between the second uplink communication and a third uplink communication satisfies a threshold amount, when there is a power change between the second uplink communication and the third uplink communication, and/or prior to the third uplink communication when the third uplink communication is not scheduled with phase coherence with the first uplink communication and/or the second uplink communication. In some instances, the BS estimates and/or determines the UE will implement the TA prior to an uplink transmission following the occurrence of one or more of these events. That is, the BS estimates and/or determines that upon occurrence of one or more of these events, the UE may delay implementing the TA until closer in time to when the UE is scheduled to transmit an uplink communication.

In some instances, the UE implements the TA at the first time. Accordingly, in some instances the second uplink communication is transmitted after the UE has implemented the TA. In this regard, the second uplink communication may be received by the BS, at step 1030, without phase coherence with the first uplink communication. Therefore, the BS, at step 1040, may process the first and second uplink communications separately, instead of jointly.

In some instances, the UE implements the TA at the second time. Accordingly, in some instances the second uplink communication is transmitted by the UE before implementing the TA. In this regard, the second uplink communication may be received by the BS, at step 1030, with phase coherence with the first uplink communication as a result of the UE implementing the TA after transmitting the second uplink communication. Therefore, the BS, at step 1040, may process the first and second uplink communications jointly, instead of separately.

Further aspects of the present disclosure include the following:

1. A method of wireless communication performed by a user equipment, the method comprising:
   receiving, from a base station, a timing advance (TA), wherein the TA is scheduled to be implemented by the user equipment at a first time, the first time being after a start of a first uplink communication of a group of bundled uplink communications scheduled with phase coherence and before a start of a second uplink communication of the group of bundled uplink communications;
   determining whether to implement the TA at the first time or a second time, the second time being after transmission of the second uplink communication; and
   implementing the TA based on the determining.
2. The method of clause 1, wherein:
   the determining whether to implement the TA at the first time or at the second time includes determining to implement the TA at the first time; and
   the implementing the TA includes implementing the TA at the first time.

3. The method of clause 2, further comprising:
   transmitting the second uplink communication after implementing the TA.
4. The method of clause 3, wherein the transmitting the second uplink communication includes transmitting the second uplink communication without phase coherence with the first uplink communication.
5. The method of any of clauses 1-4, wherein:
   the first uplink communication includes at least one of a first demodulation reference signal (DMRS) or a first sounding reference signal (SRS); and
   the second uplink communication includes at least one of a second DMRS or a second SRS.
6. The method of any of clauses 1-5, wherein:
   the first uplink communication includes at least one of a first physical uplink control channel (PUCCH) communication or a first physical uplink shared channel (PUSCH) communication; and
   the second uplink communication includes at least one of a second PUCCH communication or a second PUSCH communication.
7. The method of any of clauses 1, 5, or 6, wherein:
   the determining whether to implement the TA at the first time or at the second time includes determining to implement the TA at the second time; and
   the implementing the TA includes implementing the TA at the second time.
8. The method of clause 7, further comprising:
   transmitting the second uplink communication before implementing the TA.
9. The method of clause 8, wherein the transmitting the second uplink communication includes transmitting the second uplink communication with phase coherence with the first uplink communication.
10. The method of clause 7, further comprising:
    determining a timing for the second time based on at least one of an uplink-to-downlink switch, a downlink-to-uplink switch, a time gap between the second uplink communication and a third uplink communication, or a power change between the second uplink communication and the third uplink communication.
11. The method of clause 7, wherein the determining to implement the TA at the second time is based on determining that the first uplink communication and the second uplink communication are scheduled with phase coherence.
12. The method of clause 11, wherein the determining to implement the TA at the second time is based on determining that a third uplink communication is not scheduled with phase coherence with the first uplink communication or the second uplink communication.
13. The method any of clauses 1-12, further comprising:
    receiving, from the base station, a configuration indicating when to delay implementation of the TA from the first time to the second time,
    wherein the determining whether to implement the TA at the first time or at the second time is based on the configuration.
14. A method of wireless communication performed by a base station, the method comprising:
    transmitting, to a user equipment, a timing advance (TA), wherein the TA is scheduled to be implemented by the user equipment at a first time, the first time being after a start of a first uplink communication of a group of bundled uplink communications scheduled with phase coherence and before a start of a second uplink communication of the group of bundled uplink communications;
    receiving, from the user equipment, the first uplink communication;
    receiving, from the user equipment, the second uplink communication; and
    processing the first uplink communication and the second uplink communication based on when the TA was implemented by the user equipment.
15. The method of clause 14, wherein the processing the first uplink communication and the second uplink communication includes:
    processing the first uplink communication separately from the second uplink communication.
16. The method of clause 15, wherein the receiving the second uplink communication includes:
    receiving the second uplink communication after the user equipment has implemented the TA.
17. The method of clause 16, wherein the receiving the second uplink communication includes:
    receiving the second uplink communication without phase coherence with the first uplink communication.
18. The method any of clauses 14-17, wherein:
    the receiving the first uplink communication includes receiving at least one of a first demodulation reference signal (DMRS) or a first sounding reference signal (SRS); and
    the receiving the second uplink communication includes receiving at least one of a second DMRS or a second SRS.
19. The method of any of clauses 14-18, wherein:
    the receiving the first uplink communication includes receiving at least one of a first physical uplink control channel (PUCCH) communication or a first physical uplink shared channel (PUSCH) communication; and
    the receiving the second uplink communication includes receiving at least one of a second PUCCH communication or a second PUSCH communication.
20. The method of any of clauses 14, 18, or 19, wherein the processing the first uplink communication and the second uplink communication includes:
    processing the first uplink communication together with the second uplink communication.
21. The method of clause 20, wherein the second uplink communication was transmitted by the user equipment before the user equipment implemented the TA.
22. The method of clause 21, wherein the receiving the second uplink communication includes:
    receiving the second uplink communication with phase coherence with the first uplink communication.
23. The method of any of clauses 14-22, further comprising:
    transmitting, to the user equipment, a configuration indicating when to delay implementation of the TA from the first time to a second time.
24. A user equipment, comprising:
    a transceiver configured to:
      receive, from a base station, a timing advance (TA), wherein the TA is scheduled to be implemented by the user equipment at a first time, the first time being after a start of a first uplink communication of a group of bundled uplink communications scheduled with phase coherence and before a start of a second uplink communication of the group of bundled uplink communications; and a processor in communication with the transceiver, the processor configured to:
  determine whether to implement the TA at the first time or a second time, the second time being after transmission of the second uplink communication; and
  implement the TA based on the determination.
25. The user equipment of clause 24, wherein the processor is further configured to:
  determine to implement the TA at the first time; and
  implement the TA at the first time.
26. The user equipment of clause 25, wherein the transceiver is further configured to:
  transmit the second uplink communication after implementing the TA.
27. The user equipment of clause 26, wherein the transceiver is further configured to:
  transmit the second uplink communication without phase coherence with the first uplink communication.
28. The user equipment of any of clauses 24-27, wherein the transceiver is further configured to:
  transmit the first uplink communication including at least one of a first demodulation reference signal (DMRS) or a first sounding reference signal (SRS); and
  transmit the second uplink communication including at least one of a second DMRS or a second SRS.
29. The user equipment of any of clauses 24-28, wherein the transceiver is further configured to:
  transmit the first uplink communication including at least one of a first physical uplink control channel (PUCCH) communication or a first physical uplink shared channel (PUSCH) communication; and
  transmit the second uplink communication including at least one of a second PUCCH communication or a second PUSCH communication.
30. The user equipment of any of clauses 24, 28, or 29, wherein the processor is further configured to:
  determine to implement the TA at the second time; and
  implement the TA at the second time.
31. The user equipment of clause 30, wherein the transceiver is further configured to:
  transmit the second uplink communication before implementing the TA.
32. The user equipment of clause 31, wherein the transceiver is further configured to:
  transmit the second uplink communication with phase coherence with the first uplink communication.
33. The user equipment of clause 30, wherein the processor is further configured to:
  determine a timing for the second time based on at least one of an uplink-to-downlink switch, a downlink-to-uplink switch, a time gap between the second uplink communication and a third uplink communication, or a power change between the second uplink communication and the third uplink communication.
34. The user equipment of clause 30, wherein the processor is further configured to:
  determine to implement the TA at the second time based on determining that the first uplink communication and the second uplink communication are scheduled with phase coherence.
35. The user equipment of clause 34, wherein the processor is further configured to:
  determine to implement the TA at the second time based on determining that a third uplink communication is not scheduled with phase coherence with the first uplink communication or the second uplink communication.
36. The user equipment of any of clauses 24-35, wherein:
  the transceiver is further configured to receive, from the base station, a configuration indicating when to delay implementation of the TA from the first time to the second time; and
  the processor is further configured to determine whether to implement the TA at the first time or at the second time based on the configuration.
37. A base station, comprising:
  a transceiver configured to:
    transmit, to a user equipment, a timing advance (TA), wherein the TA is scheduled to be implemented by the user equipment at a first time, the first time being after a start of a first uplink communication of a group of bundled uplink communications scheduled with phase coherence and before a start of a second uplink communication of the group of bundled uplink communications;
    receive, from the user equipment, the first uplink communication; and
    receive, from the user equipment, the second uplink communication; and a processor in communication with the transceiver, the processor configured to:
    process the first uplink communication and the second uplink communication based on when the TA was implemented by the user equipment.
38. The base station of clause 37, wherein the processor is further configured to:
  process the first uplink communication separately from the second uplink communication.
39. The base station of clause 38, wherein the transceiver is further configured to:
  receive the second uplink communication after the user equipment has implemented the TA.
40. The base station of clause 39, wherein the transceiver is further configured to:
  receive the second uplink communication without phase coherence with the first uplink communication.
41. The base station of any of clauses 37-40, wherein the transceiver is further configured to:
  receive the first uplink communication including at least one of a first demodulation reference signal (DMRS) or a first sounding reference signal (SRS); and
  receive the second uplink communication including at least one of a second DMRS or a second SRS.
42. The base station of any of clauses 37-41, wherein the transceiver is further configured to:
  receive the first uplink communication including at least one of a first physical uplink control channel (PUCCH) communication or a first physical uplink shared channel (PUSCH) communication; and
  receive the second uplink communication including at least one of a second PUCCH communication or a second PUSCH communication.
43. The base station of any of clauses 37, 41, or 42, wherein the processor is further configured to:
  process the first uplink communication together with the second uplink communication.
44. The base station of clause 43, wherein the transceiver is further configured to:

receive the second uplink communication, wherein the second uplink communication was transmitted by the user equipment before the user equipment implemented the TA.

45. The base station of clause 44, wherein the transceiver is further configured to:
receive the second uplink communication with phase coherence with the first uplink communication.

46. The base station of any of clauses 37-45, wherein the transceiver is further configured to:
transmit, to the user equipment, a configuration indicating when to delay implementation of the TA from the first time to a second time.

47. A user equipment, comprising:
means for receiving, from a base station, a timing advance (TA), wherein the TA is scheduled to be implemented by the user equipment at a first time, the first time being after a start of a first uplink communication of a group of bundled uplink communications scheduled with phase coherence and before a start of a second uplink communication of the group of bundled uplink communications;
means for determining whether to implement the TA at the first time or a second time, the second time being after transmission of the second uplink communication; and
means for implementing the TA based on the determining 48. The user equipment of clause 47, wherein:
the means for determining whether to implement the TA at the first time or at the second time includes means for determining to implement the TA at the first time; and
the means for implementing the TA includes means for implementing the TA at the first time.

49. The user equipment of clause 48, further comprising:
means for transmitting the second uplink communication after implementing the TA.

50. The user equipment of clause 49, wherein the means for transmitting the second uplink communication includes means for transmitting the second uplink communication without phase coherence with the first uplink communication.

51. The user equipment of any of clauses 47-50, further comprising:
means for transmitting the first uplink communication, wherein the means for transmitting the first uplink communication includes means for transmitting at least one of a first demodulation reference signal (DMRS) or a first sounding reference signal (SRS); and
means for transmitting the second uplink communication, wherein the means for transmitting the second uplink communication includes means for transmitting at least one of a second DMRS or a second SRS.

52. The user equipment of any of clauses 47-51, wherein:
means for transmitting the first uplink communication, wherein the means for transmitting the first uplink communication means for transmitting at least one of a first physical uplink control channel (PUCCH) communication or a first physical uplink shared channel (PUSCH) communication; and
means for transmitting the second uplink communication, wherein the means for transmitting the second uplink communication includes means for transmitting at least one of a second PUCCH communication or a second PUSCH communication.

53. The user equipment of any of clauses 47, 51, or 52, wherein:
the means for determining whether to implement the TA at the first time or at the second time includes means for determining to implement the TA at the second time; and
the means for implementing the TA includes means for implementing the TA at the second time.

54. The user equipment of clause 53, further comprising:
means for transmitting the second uplink communication before implementing the TA.

55. The user equipment of clause 54, wherein the means for transmitting the second uplink communication includes means for transmitting the second uplink communication with phase coherence with the first uplink communication.

56. The user equipment of clause 53, further comprising:
means for determining a timing for the second time based on at least one of an uplink-to-downlink switch, a downlink-to-uplink switch, a time gap between the second uplink communication and a third uplink communication, or a power change between the second uplink communication and the third uplink communication.

57. The user equipment of clause 53, wherein the means for determining to implement the TA at the second time includes means for determining that the first uplink communication and the second uplink communication are scheduled with phase coherence.

58. The user equipment of clause 57, wherein the means for determining to implement the TA at the second time includes means for determining that a third uplink communication is not scheduled with phase coherence with the first uplink communication or the second uplink communication.

59. The user equipment of any of clauses 47-58, further comprising:
means for receiving, from the base station, a configuration indicating when to delay implementation of the TA from the first time to the second time,
wherein the means for determining whether to implement the TA at the first time or at the second time is configured to determine whether to implement the TA at the first time or at the second time based on the configuration.

60. A base station, comprising:
means for transmitting, to a user equipment, a timing advance (TA), wherein the TA is scheduled to be implemented by the user equipment at a first time, the first time being after a start of a first uplink communication of a group of bundled uplink communications scheduled with phase coherence and before a start of a second uplink communication of the group of bundled uplink communications;
means for receiving, from the user equipment, the first uplink communication;
means for receiving, from the user equipment, the second uplink communication; and
means for processing the first uplink communication and the second uplink communication based on when the TA was implemented by the user equipment.

61. The base station of clause 60, wherein the means for processing the first uplink communication and the second uplink communication includes:
means for processing the first uplink communication separately from the second uplink communication.

62. The base station of clause 61, wherein the means for receiving the second uplink communication includes:
means for receiving the second uplink communication after the user equipment has implemented the TA.
63. The base station of clause 62, wherein the means for receiving the second uplink communication includes:
means for receiving the second uplink communication without phase coherence with the first uplink communication.
64. The base station of any of clauses 60-63, wherein:
The means for receiving the first uplink communication includes means for receiving at least one of a first demodulation reference signal (DMRS) or a first sounding reference signal (SRS); and
the means for receiving the second uplink communication includes means for receiving at least one of a second DMRS or a second SRS.
65. The base station of any of clauses 60-64, wherein:
the means for receiving the first uplink communication includes means for receiving at least one of a first physical uplink control channel (PUCCH) communication or a first physical uplink shared channel (PUSCH) communication; and
the means for receiving the second uplink communication includes means for receiving at least one of a second PUCCH communication or a second PUSCH communication.
66. The base station of any of clauses 60, 64, or 65, wherein the means for processing the first uplink communication and the second uplink communication includes:
means for processing the first uplink communication together with the second uplink communication.
67. The base station of clause 66, wherein the means for receiving the second uplink communication includes means for receiving the second uplink communication, wherein the second uplink communication was transmitted by the user equipment before the user equipment implemented the TA.
68. The base station of clause 67, wherein the means for receiving the second uplink communication includes:
means for receiving the second uplink communication with phase coherence with the first uplink communication.
69. The base station of any of clauses 60-68, further comprising:
means for transmitting, to the user equipment, a configuration indicating when to delay implementation of the TA from the first time to a second time.
70. A non-transitory computer-readable medium having program code recorded thereon for wireless communication by a user equipment, the program code comprising:
code for causing the user equipment to receive, from a base station, a timing advance (TA), wherein the TA is scheduled to be implemented by the user equipment at a first time, the first time being after a start of a first uplink communication of a group of bundled uplink communications scheduled with phase coherence and before a start of a second uplink communication of the group of bundled uplink communications;
code for causing the user equipment to determine whether to implement the TA at the first time or a second time, the second time being after transmission of the second uplink communication; and
code for causing the user equipment to implement the TA based on the determining 71. The non-transitory computer-readable medium of clause 70, wherein:
the code for causing the user equipment to determine whether to implement the TA at the first time or at the second time includes code for causing the user equipment to determine to implement the TA at the first time; and
the code for causing the user equipment to implement the TA includes code for causing the user equipment to implement the TA at the first time.
72. The non-transitory computer-readable medium of clause 71, further comprising:
code for causing the user equipment to transmit the second uplink communication after implementing the TA.
73. The non-transitory computer-readable medium of clause 72, wherein the code for causing the user equipment to transmit the second uplink communication includes code for causing the user equipment to transmit the second uplink communication without phase coherence with the first uplink communication.
74. The non-transitory computer-readable medium of any of clauses 70-73, wherein:
the code for causing the user equipment to the first uplink communication includes code for causing the user equipment to transmit at least one of a first demodulation reference signal (DMRS) or a first sounding reference signal (SRS); and
the code for causing the user equipment to transmit the second uplink communication includes code for causing the user equipment to transmit at least one of a second DMRS or a second SRS.
75. The non-transitory computer-readable medium of any of clauses 70-74, wherein:
the code for causing the user equipment to transmit the first uplink communication includes code for causing the user equipment to transmit at least one of a first physical uplink control channel (PUCCH) communication or a first physical uplink shared channel (PUSCH) communication; and
the code for causing the user equipment to transmit the second uplink communication includes code for causing the user equipment to transmit at least one of a second PUCCH communication or a second PUSCH communication.
76. The non-transitory computer-readable medium of any of clauses 70, 74, or 75, wherein:
the code for causing the user equipment to determine whether to implement the TA at the first time or at the second time includes code for causing the user equipment to determine to implement the TA at the second time; and
the code for causing the user equipment to implement the TA includes code for causing the user equipment to implement the TA at the second time.
77. The non-transitory computer-readable medium of clause 76, further comprising:
code for causing the user equipment to transmit the second uplink communication before implementing the TA.
78. The non-transitory computer-readable medium of clause 77, wherein the code for causing the user equipment to transmit the second uplink communication includes code for causing the user equipment to transmit the second uplink communication with phase coherence with the first uplink communication.

79. The non-transitory computer-readable medium of clause 76, further comprising:
code for causing the user equipment to determine a timing for the second time based on at least one of an uplink-to-downlink switch, a downlink-to-uplink switch, a time gap between the second uplink communication and a third uplink communication, or a power change between the second uplink communication and the third uplink communication.

80. The non-transitory computer-readable medium of clause 76, wherein the code for causing the user equipment to determine to implement the TA at the second time includes code for causing the user equipment to determine that the first uplink communication and the second uplink communication are scheduled with phase coherence.

81. The non-transitory computer-readable medium of clause 80, wherein the code for causing the user equipment to determine to implement the TA at the second time includes code for causing the user equipment to determine that a third uplink communication is not scheduled with phase coherence with the first uplink communication or the second uplink communication.

82. The non-transitory computer-readable medium of any of clauses 70-82, further comprising:
code for causing the user equipment to receive, from the base station, a configuration indicating when to delay implementation of the TA from the first time to the second time,
wherein the code for causing the user equipment to determine whether to implement the TA at the first time or at the second time includes code for causing the user equipment to determine whether to implement the TA at the first time or at the second time based on the configuration.

83. A non-transitory computer-readable medium having program code recorded thereon for wireless communication by a base station, the program code comprising:
code for causing the base station to transmit, to a user equipment, a timing advance (TA), wherein the TA is scheduled to be implemented by the user equipment at a first time, the first time being after a start of a first uplink communication of a group of bundled uplink communications scheduled with phase coherence and before a start of a second uplink communication of the group of bundled uplink communications;
code for causing the base station to receive, from the user equipment, the first uplink communication;
code for causing the base station to receive, from the user equipment, the second uplink communication; and
code for causing the base station to process the first uplink communication and the second uplink communication based on when the TA was implemented by the user equipment.

84. The non-transitory computer-readable medium of clause 83, wherein the code for causing the base station to process the first uplink communication and the second uplink communication includes:
code for causing the base station to process the first uplink communication separately from the second uplink communication.

85. The non-transitory computer-readable medium of clause 84, wherein the code for causing the base station to receive the second uplink communication includes:
code for causing the base station to receive the second uplink communication after the user equipment has implemented the TA.

86. The non-transitory computer-readable medium of clause 85, wherein the code for causing the base station to receive the second uplink communication includes:
code for causing the base station to receive the second uplink communication without phase coherence with the first uplink communication.

87. The non-transitory computer-readable medium of any of clauses 83-86, wherein:
the code for causing the base station to receive the first uplink communication includes code for causing the base station to receive at least one of a first demodulation reference signal (DMRS) or a first sounding reference signal (SRS); and
the code for causing the base station to receive the second uplink communication includes code for causing the base station to receive at least one of a second DMRS or a second SRS.

88. The non-transitory computer-readable medium of any of clauses 83-87, wherein:
the code for causing the base station to receive the first uplink communication includes code for causing the base station to receive at least one of a first physical uplink control channel (PUCCH) communication or a first physical uplink shared channel (PUSCH) communication; and
the code for causing the base station to receive the second uplink communication includes code for causing the base station to receive at least one of a second PUCCH communication or a second PUSCH communication.

89. The non-transitory computer-readable medium of any of clauses 83, 88, or 89, wherein the code for causing the base station to process the first uplink communication and the second uplink communication includes:
code for causing the base station to process the first uplink communication together with the second uplink communication.

90. The non-transitory computer-readable medium of clause 89, wherein the code for causing the base station to receive the second uplink communication includes code for causing the base station to receive the second uplink communication, wherein the second uplink communication was transmitted by the user equipment before the user equipment implemented the TA.

91. The non-transitory computer-readable medium of clause 90, wherein the code for causing the base station to receive the second uplink communication includes:
code for causing the base station to receive the second uplink communication with phase coherence with the first uplink communication.

92. The non-transitory computer-readable medium of any of clauses 83-91, further comprising:
code for causing the base station to transmit, to the user equipment, a configuration indicating when to delay implementation of the TA from the first time to a second time.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely some examples thereof, but rather, should be fully commensurate with that of the claims appended hereafter and their functional equivalents.

What is claimed is:

1. A method of wireless communication performed by a user equipment, the method comprising:
   receiving a timing advance (TA) communication;
   performing, based on the TA communication and a TA value, uplink timing adjustment after a start of a first uplink communication of a group of bundled uplink communications to be transmitted with phase continuity and before a start of a second uplink communication of the group of bundled uplink communications; and
   transmitting, after the uplink timing adjustment, the second communication without phase continuity with the first uplink communication.

2. The method of claim 1, wherein:
   the group of bundled uplink communications includes at least one of a demodulation reference signal (DMRS) or a sounding reference signal (SRS).

3. The method of claim 1, wherein:
   the group of bundled uplink communications includes at least one of a physical uplink control channel (PUCCH) communication or a physical uplink shared channel (PUSCH) communication.

4. The method of claim 1, further comprising:
   receiving a configuration indicating when to delay performing the uplink timing adjustment, wherein the performing the uplink timing adjustment is based on the configuration.

5. A method of wireless communication performed by a base station, the method comprising:
   transmitting, to a user equipment, a timing advance (TA) communication;
   receiving, from the user equipment, a first uplink communication of a group of bundled uplink communications to be communicated with phase continuity; and
   receiving, from the user equipment after the user equipment has performed uplink timing adjustment after a start of the first uplink communication and before a start of a second uplink communication of the group of bundled uplink communications, the second uplink communication without phase continuity with the first uplink communication.

6. The method of claim 5, wherein:
   the group of uplink communications includes at least one of a demodulation reference signal (DMRS) or a sounding reference signal (SRS).

7. The method of claim 5, wherein:
   the group of uplink communications includes at least one of a physical uplink control channel (PUCCH) communication or a physical uplink shared channel (PUSCH) communication.

8. The method of claim 5, further comprising:
   processing the first uplink communication together with a third uplink communication received after the first uplink communication and prior to the second uplink communication.

9. The method of claim 8, further comprising:
   receiving, before the user equipment performs the uplink timing adjustment, the first uplink communication and the third uplink communication, wherein the first uplink communication and the third uplink communication have phase continuity.

10. The method of claim 5, further comprising:
    transmitting, to the user equipment, a configuration indicating when to delay performing the uplink timing adjustment.

11. A user equipment comprising:
    at least one memory;
    at least one transceiver; and
    at least one processor coupled to the at least one memory and the at least one transceiver, wherein the user equipment is configured to:
       receive a timing advance (TA) communication;
       perform, based on the TA communication and a TA value, uplink timing adjustment after a start of a first uplink communication of a group of bundled uplink communications to be transmitted with phase continuity and before a start of a second uplink communication of the group of bundled uplink communications; and
       transmit, after the uplink timing adjustment, the second communication without phase continuity with the first uplink communication.

12. The user equipment of claim 11, wherein the user equipment is further configured to:
    receive a configuration indicating when to delay performance of the uplink timing adjustment, wherein, to perform the uplink timing adjustment, the user equipment is configured to perform the uplink timing adjustment based on the configuration.

13. A user equipment, comprising:
    means for receiving a timing advance (TA) communication;
    means for performing, based on the TA communication and a TA value, uplink timing adjustment after a start of a first uplink communication of a group of bundled uplink communications to be transmitted with phase continuity and before a start of a second uplink communication of the group of bundled uplink communications; and means for transmitting, after the uplink timing adjustment the second communication without phase continuity with the first uplink communication.

14. The user equipment of claim 11, wherein:
the group of bundled uplink communications includes at least one of a demodulation reference signal (DMRS) or a sounding reference signal (SRS).

15. The user equipment of claim 11, wherein:
the group of bundled uplink communications includes at least one of a physical uplink control channel (PUCCH) communication or a physical uplink shared channel (PUSCH) communication.

16. The method of claim 1, wherein the receiving the TA communication comprises receiving a media access control control element (MAC-CE).

17. The method of claim 1, wherein:
the first uplink communication includes a first demodulation reference signal (DMRS); and
the second uplink communication includes a second DMRS.

18. The method of claim 1, wherein:
the first uplink communication includes a first physical uplink control channel (PUCCH) communication; and
the second uplink communication includes a second PUCCH communication.

19. The method of claim 1, wherein:
the first uplink communication includes a first physical uplink shared channel (PUSCH) communication; and
the second uplink communication includes a second PUSCH communication.

20. The method of claim 1, wherein:
the first uplink communication includes at least one of a first physical uplink control channel (PUCCH) communication or a first physical uplink shared channel (PUSCH) communication; and
the second uplink communication includes at least one of a second PUCCH communication or a second PUSCH communication.

21. The user equipment of claim 11, wherein:
the first uplink communication includes a first demodulation reference signal (DMRS); and
the second uplink communication includes a second DMRS.

22. The user equipment of claim 11, wherein:
the first uplink communication includes a first physical uplink control channel (PUCCH) communication; and
the second uplink communication includes a second PUCCH communication.

23. The user equipment of claim 11, wherein:
the first uplink communication includes a first physical uplink shared channel (PUSCH) communication; and
the second uplink communication includes a second PUSCH communication.

24. The user equipment of claim 11, wherein:
the first uplink communication includes at least one of a first physical uplink control channel (PUCCH) communication or a first physical uplink shared channel (PUSCH) communication; and
the second uplink communication includes at least one of a second PUCCH communication or a second PUSCH communication.

\* \* \* \* \*